United States Patent
Hida et al.

(10) Patent No.: US 10,104,569 B2
(45) Date of Patent: Oct. 16, 2018

(54) DEVICE CONTROLLING ACCESS TO CONTENT DISTRIBUTION, METHOD FOR CONTROLLING ACCESS TO CONTENT DISTRIBUTION, AND STORAGE MEDIUM RECORDING PROGRAM FOR CONTROLLING ACCESS TO CONTENT DISTRIBUTION

(71) Applicant: FUJITSU LIMITED, Kawasaki-shi, Kanagawa (JP)

(72) Inventors: Kazuo Hida, Sagamihara (JP); Takashi Ohno, Kobe (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/628,674

(22) Filed: Jun. 21, 2017

(65) Prior Publication Data

US 2018/0063739 A1 Mar. 1, 2018

(30) Foreign Application Priority Data

Aug. 31, 2016 (JP) .................................. 2016-169113

(51) Int. Cl.
*H04W 28/02* (2009.01)
*H04L 29/08* (2006.01)
(Continued)

(52) U.S. Cl.
CPC ....... *H04W 28/0205* (2013.01); *H04L 67/325* (2013.01); *H04W 4/02* (2013.01); *H04W 4/20* (2013.01)

(58) Field of Classification Search
CPC . H04L 12/413; H04L 43/062; H04L 43/0852; H04L 47/22; H04L 67/10;
(Continued)

(56) References Cited

U.S. PATENT DOCUMENTS 9,361,630 B1 6/2016 Goswami
2009/0086701 A1 4/2009 Lohmar et al.
(Continued)

FOREIGN PATENT DOCUMENTS

JP 2000-258567 9/2000
JP 2003303171 A * 10/2003
(Continued)

OTHER PUBLICATIONS

Extended Search Report dated Jan. 26, 2018 in European Patent Application No. 17176493.9.

*Primary Examiner* — Nam Huynh
(74) *Attorney, Agent, or Firm* — Oblon, McClelland, Maier & Neustadt, L.L.P.

(57) ABSTRACT

A device includes: a memory; and a processor coupled to the memory and configured to: calculate a number of devices which are estimated to access at a same time to an apparatus that provides a service corresponding to the event when a signal as a trigger for occurrence of an event is received, calculate a standby time from an occurrence time of the event based on the number of devices and a condition related to the service or the apparatus, and access to the apparatus after staying in standby from the occurrence time of the event until the standby time elapses.

20 Claims, 35 Drawing Sheets

(51) Int. Cl.
*H04W 4/02* (2018.01)
*H04W 4/20* (2018.01)

(58) Field of Classification Search
CPC ..... H04L 67/141; H04L 67/22; H04L 67/306;
H04L 67/325; H04L 67/36; H04L 67/42;
H04N 21/2143; H04N 21/2385; H04N
21/43615; H04N 27/4782; H04N 21/6125
See application file for complete search history.

(56) References Cited

U.S. PATENT DOCUMENTS

2012/0047531 A1 2/2012 Eyer
2015/0046942 A1 2/2015 Eyer

FOREIGN PATENT DOCUMENTS

| JP | 2004-112128 | 4/2004 |
| JP | 2012-203650 | 10/2012 |
| JP | 2014-134874 | 7/2014 |
| JP | 2016-19174 | 2/2016 |

\* cited by examiner

FIG. 3
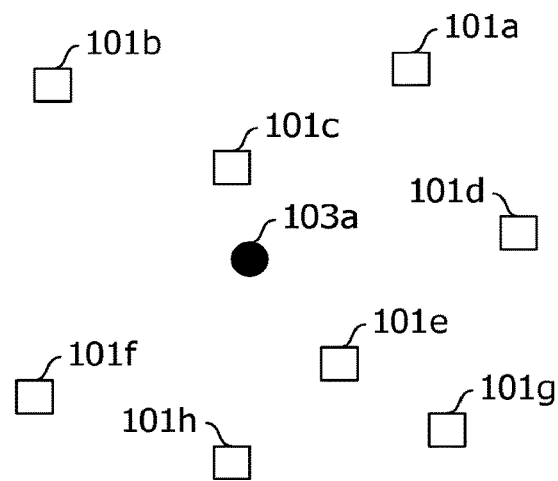
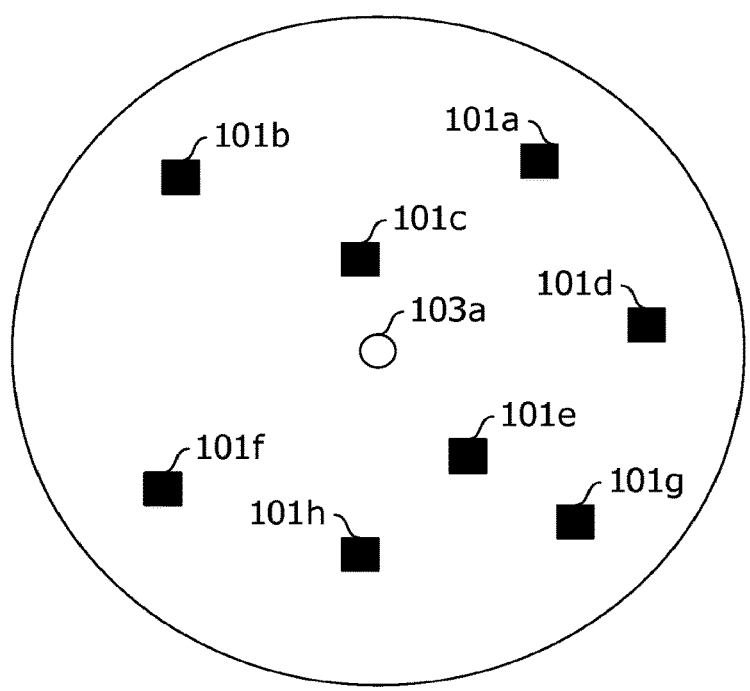

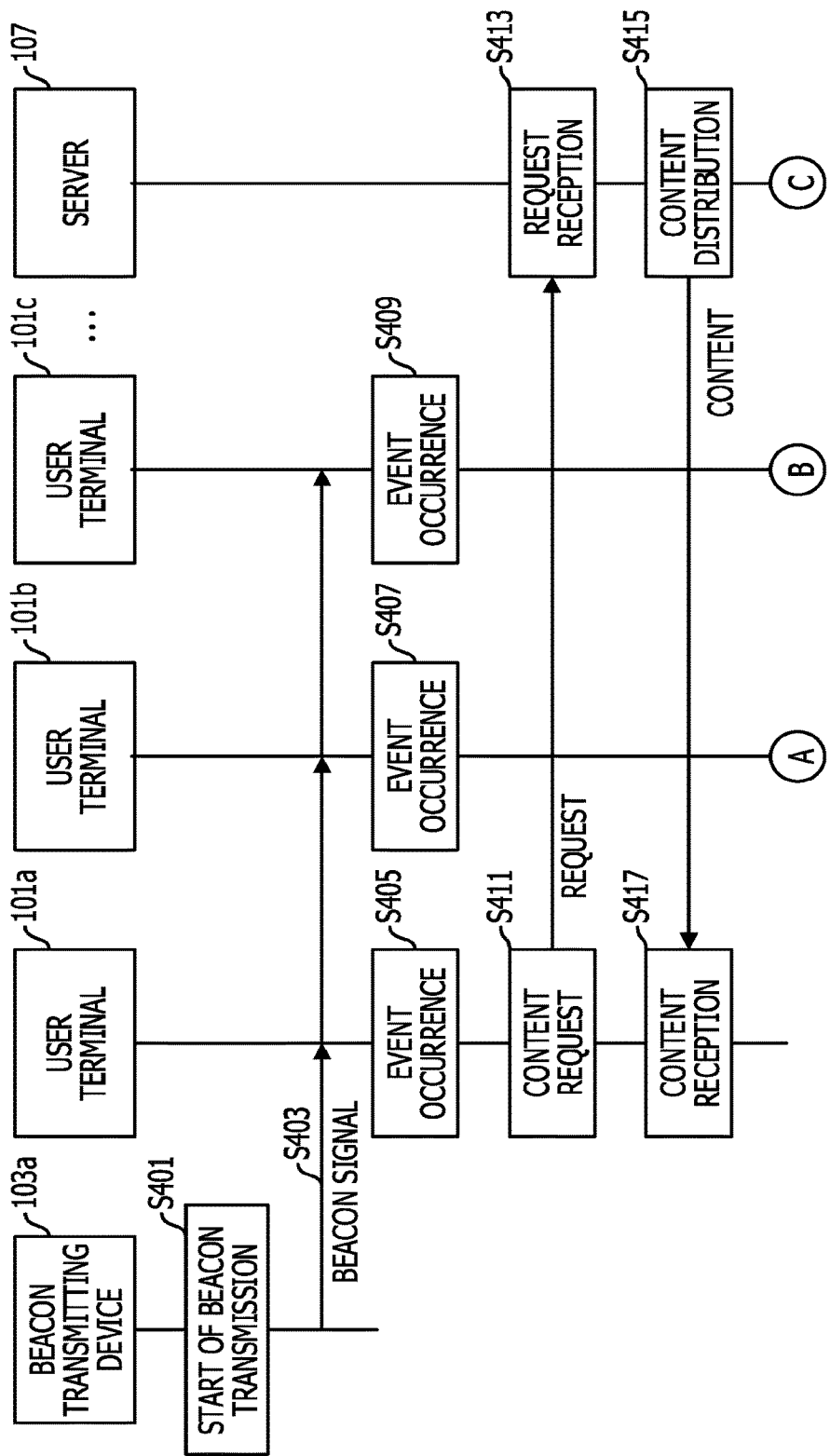

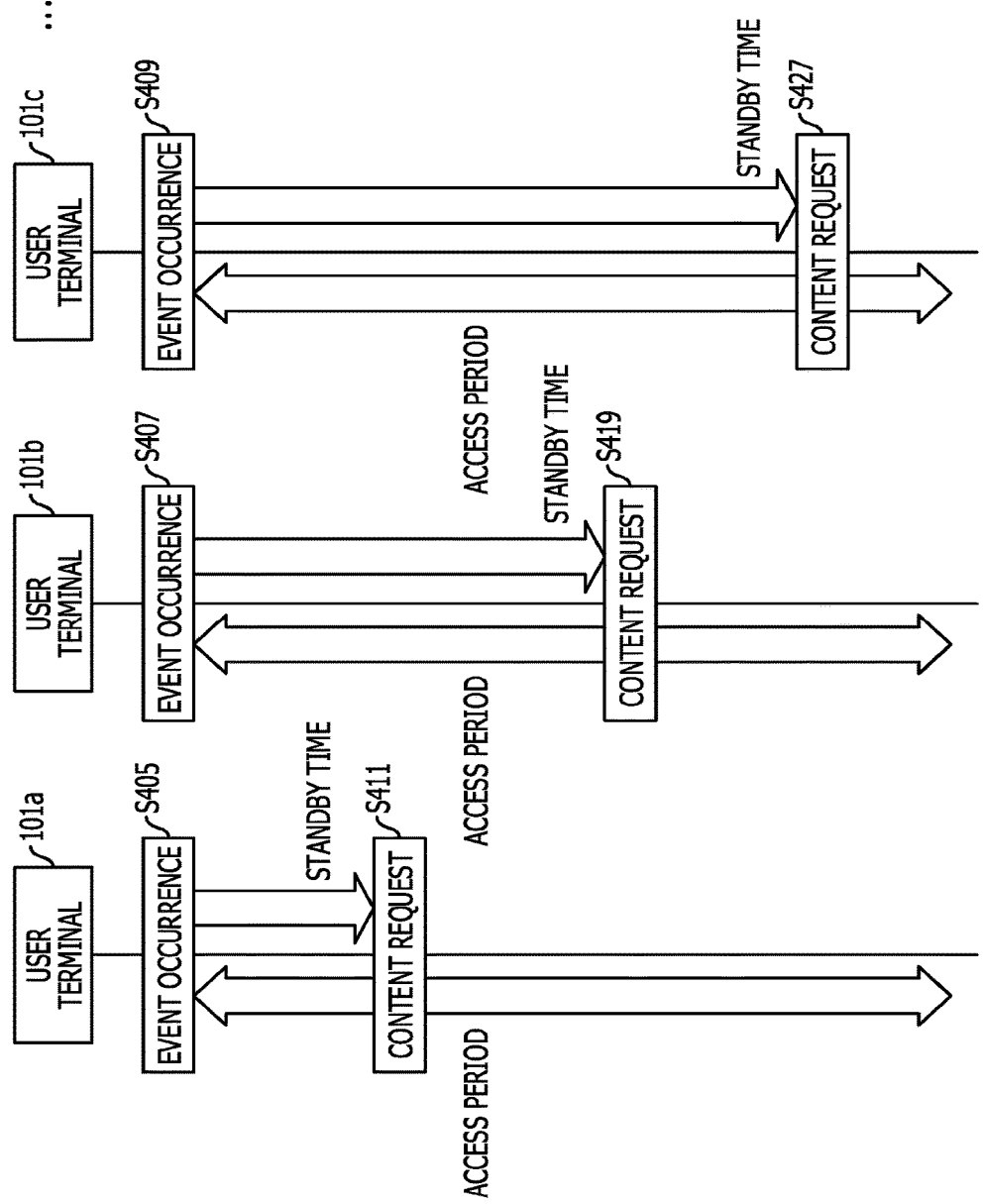

FIG. 8
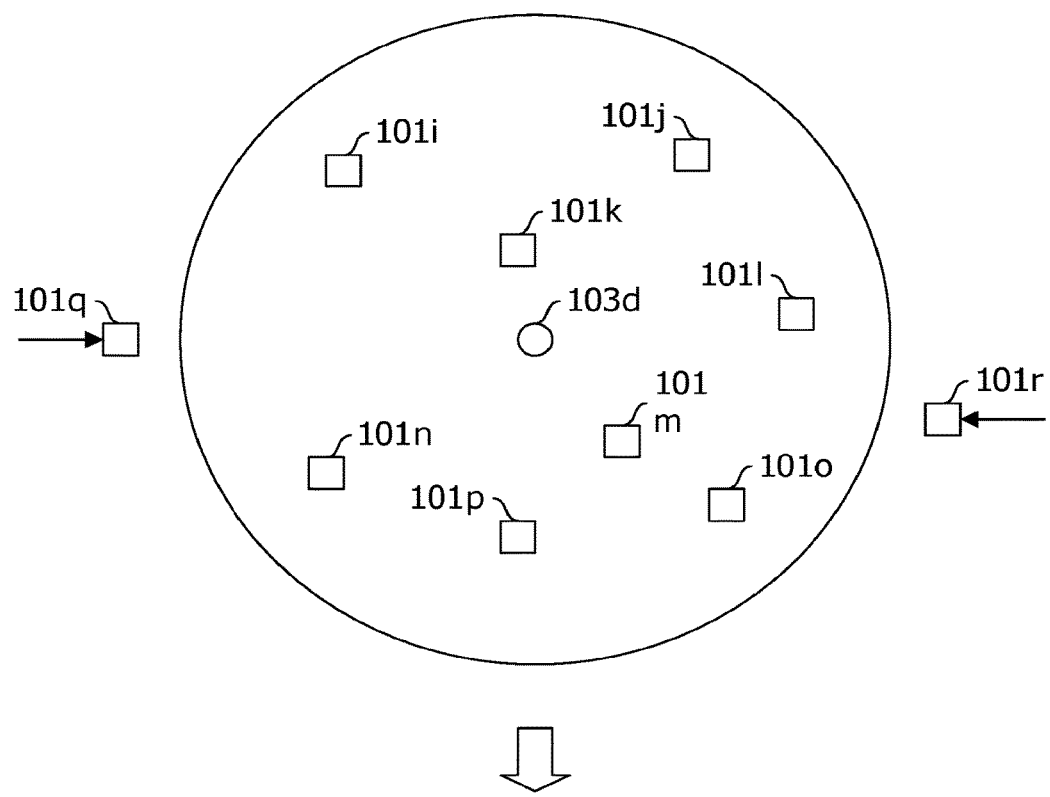
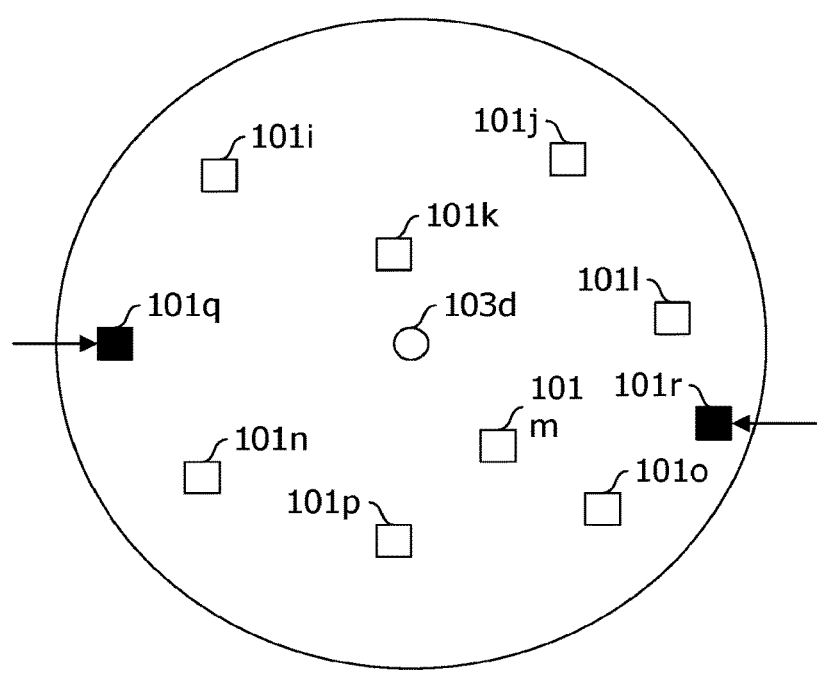

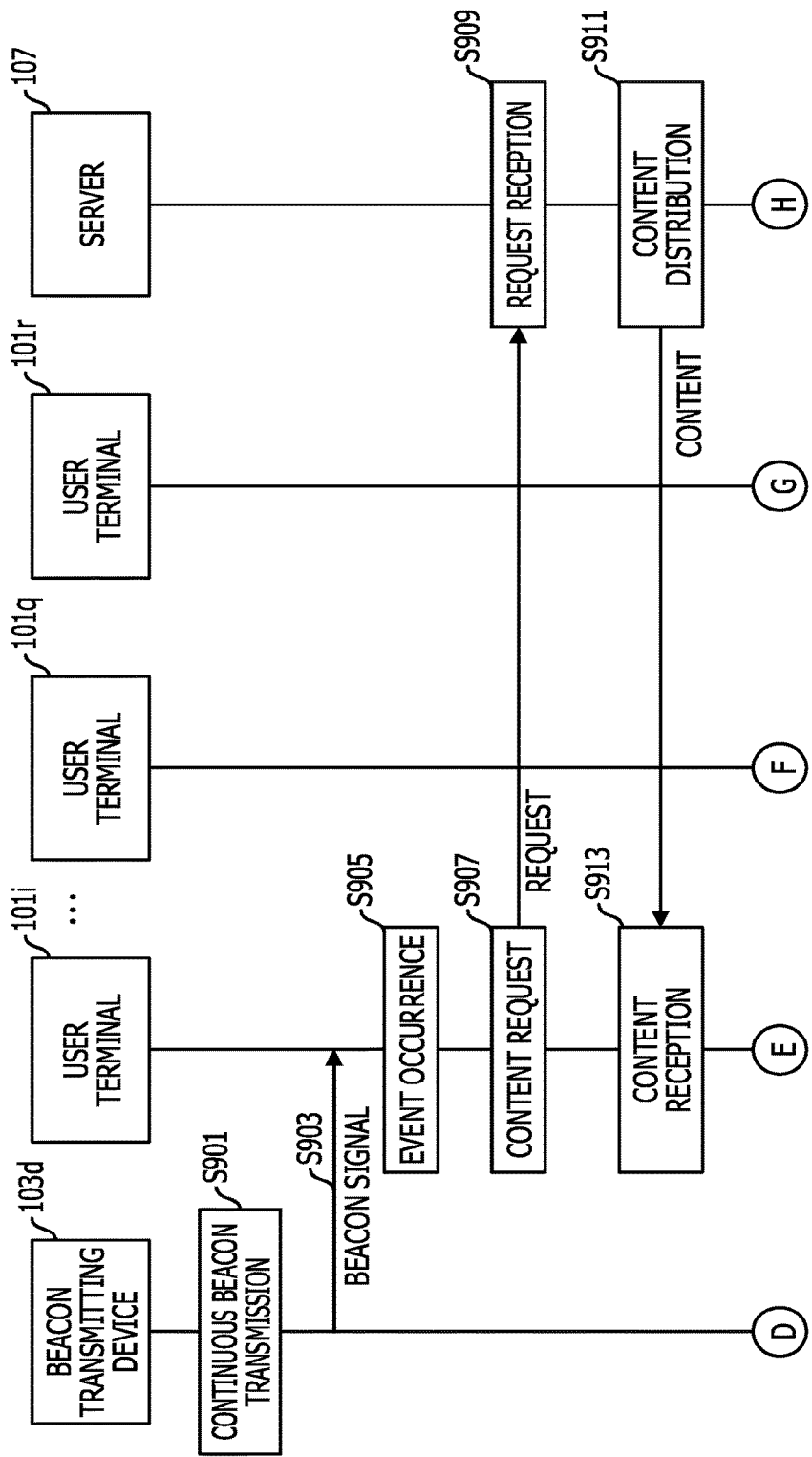

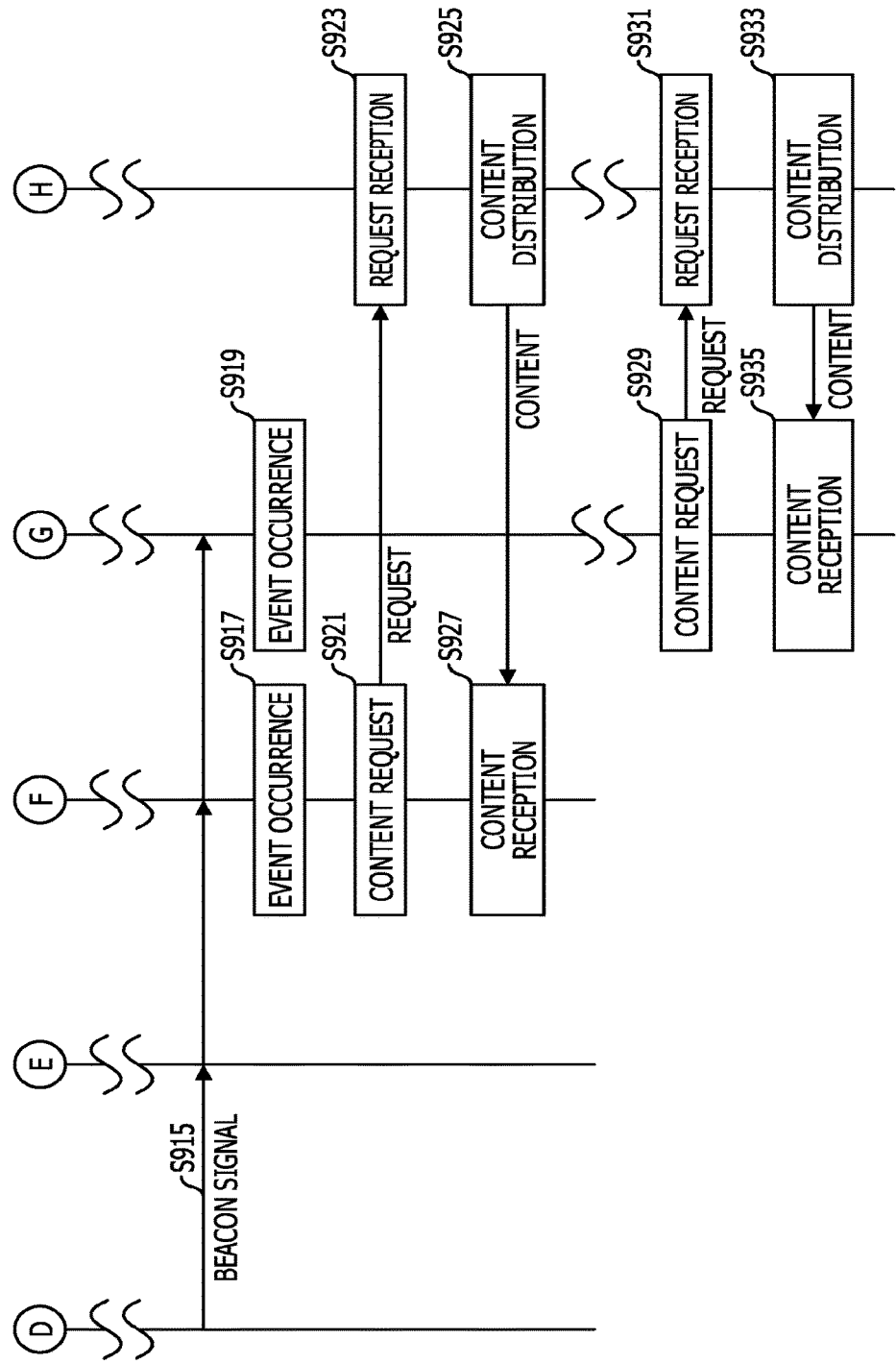

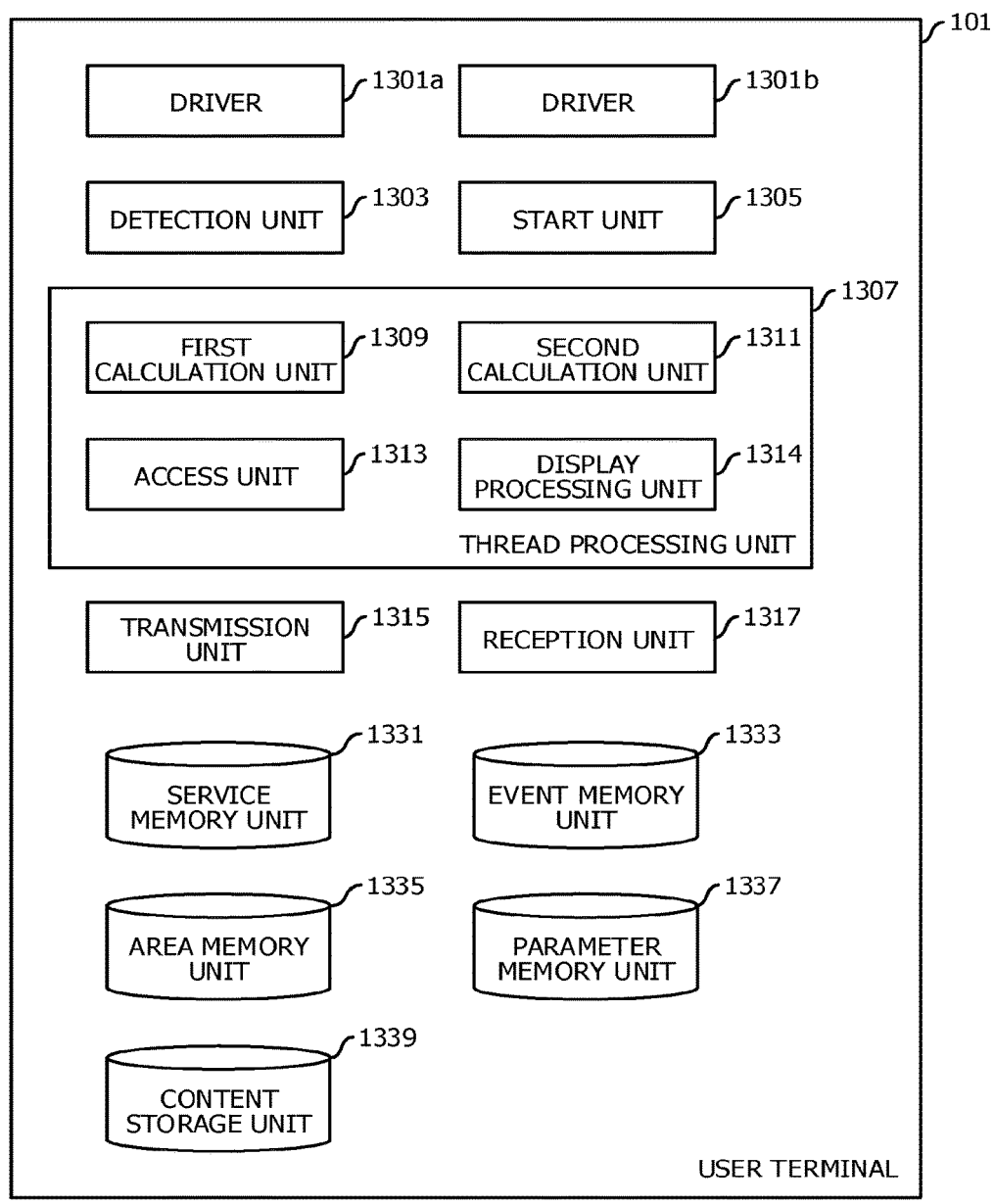

FIG. 14

| SERVICE NAME | | "SEMINAR SUPPORT" |
|---|---|---|
| SERVICE ID | | S01 |
| RESPONSE SPEED OF SERVER | | $v_1$ |
| UPPER LIMIT OF STANDBY TIME (SEC) | | 20 |
| PRIORITY INDEX OF A SELF-TERMINAL | | 0.5 |
| NUMBER OF SERVERS | | 3 |
| SERVER DEFINITION | PRIORITY ORDER OF SERVER | 1 |
| | SERVER ID | V01 |
| | IP ADDRESS | x.x.x.1 |
| SERVER DEFINITION | PRIORITY ORDER OF SERVER | 2 |
| | SERVER ID | V02 |
| | IP ADDRESS | x.x.x.2 |
| SERVER DEFINITION | PRIORITY ORDER OF SERVER | 3 |
| | SERVER ID | V03 |
| | IP ADDRESS | x.x.x.3 |

FIG. 15

| EVENT NAME | | | "INFORMATION MATERIAL DISTRIBUTION" |
|---|---|---|---|
| EVENT ID | | | E01 |
| SERVICE ID | | | S01 |
| EVENT OCCURRENCE CONDITION | LOGICAL OPERATOR | | OR |
| | NUMBER OF COMBINATION | | 3 |
| | SIGNAL DETECTION CONDITION | COMMUNICATION SYSTEM | FIRST WIRELESS COMMUNICATION SYSTEM |
| | | SIGNAL VALUE | VALUE X |
| | | TRANSMISSION DEVICE ID | A01 |
| | SIGNAL DETECTION CONDITION | COMMUNICATION SYSTEM | FIRST WIRELESS COMMUNICATION SYSTEM |
| | | SIGNAL VALUE | VALUE Y |
| | | TRANSMISSION DEVICE ID | A02 |
| | SIGNAL DETECTION CONDITION | COMMUNICATION SYSTEM | SECOND WIRELESS COMMUNICATION SYSTEM |
| | | SIGNAL VALUE | VALUE Z |
| | | TRANSMISSION DEVICE ID | B01 |

FIG. 16

| AREA NAME | "FIRST VENUE" |
|---|---|
| AREA ID | R01 |
| COMMUNICATION SYSTEM | FIRST WIRELESS COMMUNICATION SYSTEM |
| TRANSMISSION DEVICE ID | A01 |
| DETECTION STYLE | CONCURRENT TYPE |
| RADIO DISTANCE (M) | 10 |
| DENSITY (NUMBER OF SETS/M2) | 0.1 |

FIG. 17

| RECEPTION INTERVAL (SEC) | 1.0 |
|---|---|
| MOVEMENT SPEED (M/S) | 1.25 |

DEVICE CONTROLLING ACCESS TO CONTENT DISTRIBUTION, METHOD FOR CONTROLLING ACCESS TO CONTENT DISTRIBUTION, AND STORAGE MEDIUM RECORDING PROGRAM FOR CONTROLLING ACCESS TO CONTENT DISTRIBUTION

CROSS-REFERENCE TO RELATED APPLICATION

This application is based upon and claims the benefit of priority of the prior Japanese Patent Application No. 2016-169113, filed on Aug. 31, 2016, the entire contents of which are incorporated herein by reference.

FIELD

The embodiments discussed herein are related to a technique that controls access from a device to an apparatus that provides services.

BACKGROUND

An automatic distribution system is configured to, for instance when a user terminal such as a smartphone receives a signal as a trigger for occurrence of an event, automatically access to a server and obtains content based on the occurrence of the event.

As examples of related art, there are Japanese Laid-open Patent Publication No. 2014-134874, Japanese Laid-open Patent Publication No. 2000-258567, Japanese Laid-open Patent Publication No. 2004-112128, Japanese Laid-open Patent Publication No. 2012-203650, and Japanese Laid-open Patent Publication No. 2016-019174.

SUMMARY

According to an aspect of the invention, a device includes: a memory; and a processor coupled to the memory and configured to: calculate a number of devices which are estimated to access at a same time to an apparatus that provides a service corresponding to the event when a signal as a trigger for occurrence of an event is received, calculate a standby time from an occurrence time of the event based on the number of devices and a condition related to the service or the apparatus, and access to the apparatus after staying in standby from the occurrence time of the event until the standby time elapses.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates the manner in which events occur;
FIG. 4A illustrates an example sequence of event occurrence and access;
FIG. 5 illustrates example access periods and example standby times;
FIG. 8 illustrates the manner in which events occur;
FIG. 9A illustrates an example sequence of event occurrence and access;
FIG. 9B illustrates an example sequence of event occurrence and access;
FIG. 13 illustrates an example module configuration of a user terminal;
FIG. 14 illustrates an example service table;
FIG. 15 illustrates an example event table;
FIG. 16 illustrates an example area table;
FIG. 17 illustrates an example parameter table.

DESCRIPTION OF EMBODIMENTS

In the case where many user terminals utilizing an automatic distribution system as described above concentrate on a specific site, events occur at the same time, and the user terminals access to a server all at once. As a result, the service for distribution of content is congested.

To cope with this, if the time of access is shifted in the user terminals in which events have occurred at the same time, it is expected that concentration of access is avoided. However, when a wide range for distributing the time of access is set, an unrequested delay may occur.

In an aspect of the present disclosure, a standby time for shifting the time of access is made more appropriate.

First Embodiment

Figure 1:
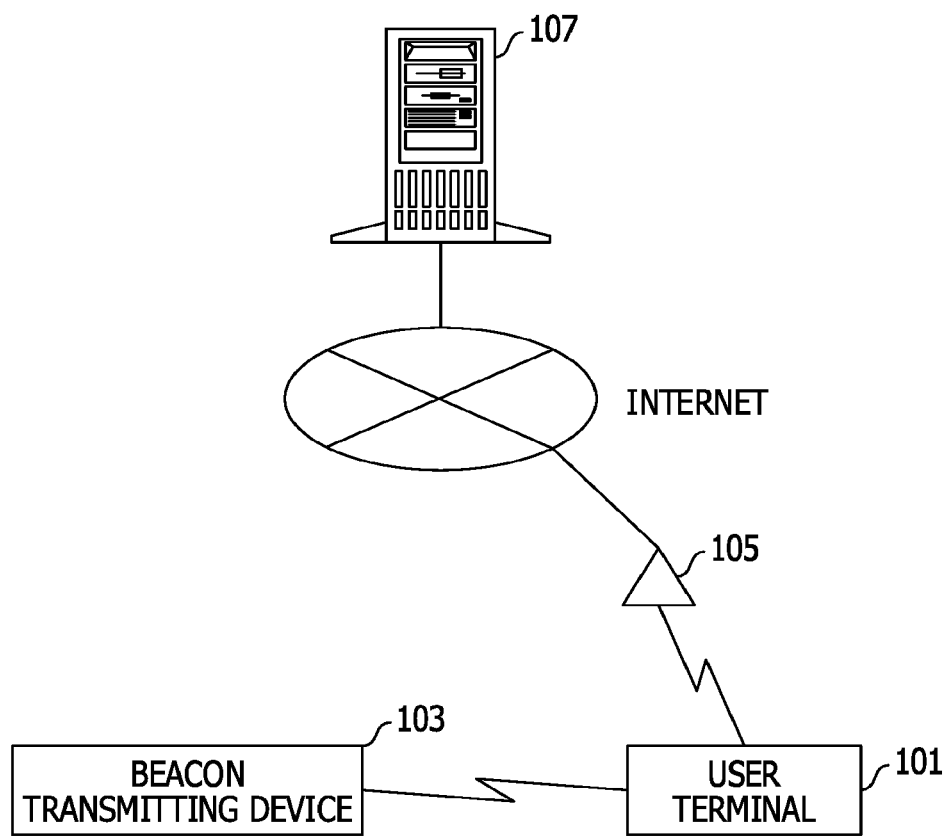
FIG. 1 illustrates an example network configuration.

FIG. 1 illustrates an example network configuration. A server 107 provides a content distribution service. A user who utilizes the content distribution service owns a user terminal 101. The user terminal 101, when approaching a beacon transmitting device 103, receives content from the server 107. It is to be noted that the user terminal 101 has a function of accessing to the server 107 via an access point 105.

Figure 2:
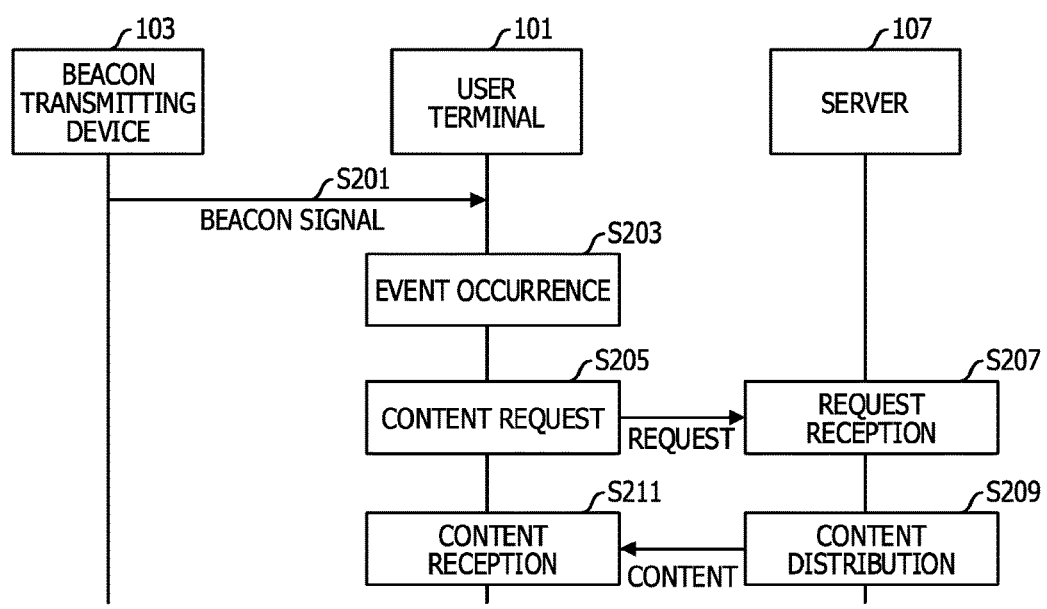
FIG. 2 illustrates an example sequence of content distribution service.

FIG. 2 illustrates an example sequence of the content distribution service. The beacon transmitting device 103 transmits a beacon signal (S201), and the user terminal 101 receives the beacon signal. When the user terminal 101 determines that an event has occurred based on the received beacon signal (S203), the user terminal 101 requests for content to the server 107 (S205).

Upon receiving a request sent from the user terminal 101 (S207), the server 107 distributes the content to the user terminal 101 (S209). The user terminal 101 then receives and stores the content (S211).

The operation to attempt to access to the server 107 all at once by multiple user terminals 101 will be described using FIG. 3. FIG. 3 illustrates the manner in which events occur. The upper half of FIG. 3 assumes that a great number of user terminals 101 utilizing the content distribution service is present near a beacon transmitting device 103a. At this point, the beacon transmitting device 103a is not sending a beacon signal. It is also assumed that any of user terminals 101a to 101h present near the beacon transmitting device 103a has not received content yet.

The lower half of FIG. 3 illustrates a state where the beacon transmitting device 103a has started beacon transmission. A large circle indicates the range reached by radio waves of a beacon signal sent from the beacon transmitting device 103a. The user terminals 101a to 101h present within the range receive a beacon signal at the same time, and detect an occurrence of an event at the same time. The user terminals 101a to 101h then attempt to access to the server 107 all at once. In this embodiment, in order to avoid concentration of such access, the time of access is distributed.

Figure 4B:
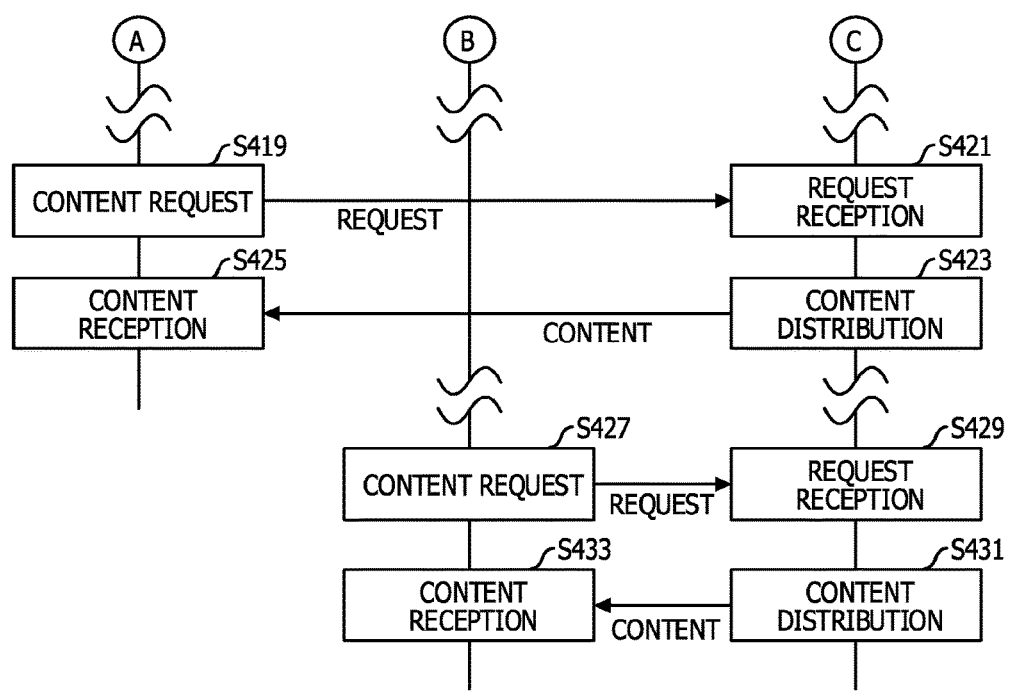
FIG. 4B illustrates an example sequence of access.

The distribution of the time of access will be described using FIGS. 4A and 4B. FIG. 4A illustrates an example sequence of event occurrence and access, and FIG. 4B illustrates an example sequence of access. When the beacon transmitting device 103a starts beacon transmission (S401), a beacon signal arrives at the user terminals 101a to 101c (S403).

The user terminal 101a which has received a beacon signal determines that an event has occurred based on the beacon signal (S405). The user terminal 101b which has received a beacon signal at the same time also determines that an event has occurred based on the beacon signal (S407). In addition, the user terminal 101c which has received a beacon signal at the same time also determines that an event has occurred based on the beacon signal (S409).

In this example, the user terminal 101a requests for content after an elapse of a short standby time (S411). Upon receiving a request sent from the user terminal 101a (S413), the server 107 distributes content to the user terminal 101a (S415). The user terminal 101a then receives and stores the content (S417). The discussion proceeds to the sequence of FIG. 4B via a terminal A, a terminal B, and a terminal C.

Proceeding to description of FIG. 4B, in this example, the user terminal 101b requests for content after staying in standby for a longer time than the user terminal 101a (S419). Upon receiving a request sent from the user terminal 101b (S421), the server 107 distributes the content to the user terminal 101b (S423). The user terminal 101b then receives and stores the content (S425).

In this example, the user terminal 101c requests for content after staying in standby for a longer time than the user terminal 101b (S427). Upon receiving a request sent from the user terminal 101c (S429), the server 107 distributes the content to the user terminal 101c (S431). The user terminal 101c then receives and stores the content (S433).

Similarly, other user terminals 101d to 101h also set a standby time by itself, and delays the access.

Next, a method of setting of a standby time will be described using FIG. 5. FIG. 5 illustrates example access periods and example standby times. The user terminal 101a, when determining that an event has occurred in S405, sets an access period. The user terminal 101a then identifies a certain time in the access period as the time for a content request. At this point, the user terminal 101a determines the time for a content request at random. In other words, the time for a content request in the access period is selected with uniform probability without a deviation.

The user terminal 101b, when determining that an event has occurred in S407, also sets an access period similarly to the case of the user terminal 101a. Similarly to the case of the user terminal 101a, the user terminal 101b identifies the time for a content request in the access period at random. Therefore, the standby time in the user terminal 101b has no relationship with the standby time in the user terminal 101a.

In addition, the user terminal 101c, when determining that an event has occurred in S409, also sets an access period similarly to the case of the user terminal 101a and the user terminal 101b. The user terminal 101c identifies the time for a content request in the access period at random similarly to the case of the user terminal 101a and the user terminal 101b. The standby time in the user terminal 101c also has no relationship with the standby time in the user terminal 101a and the standby time in the user terminal 101b.

The user terminals 101d to 101h are processed in a similar manner. When the standby time is independently set in each of the user terminals 101a to 101h in this manner, the times of access are uniformly distributed as a consequence.

However, when each access period length is too short, an access frequency increases, which may exceed the throughput of the server 107. In contrast, when each access period length is too long, an access completion time in each of the user terminals 101a to 101h is unnecessarily delayed. Therefore, it is important to set an appropriate access period in each user terminal 101.

In this embodiment, on the precondition that the server 107 processes each access with a predetermined response speed, accesses are distributed so that the throughput of the server 107 is not exceeded. Thus, the user terminal 101 estimates the number of user terminals 101 that detect an event occurrence at the same time. Specifically, the number of user terminals 101 is estimated by multiplying the area which may include these user terminals 101 by the density of the user terminal 101.

Figure 6:
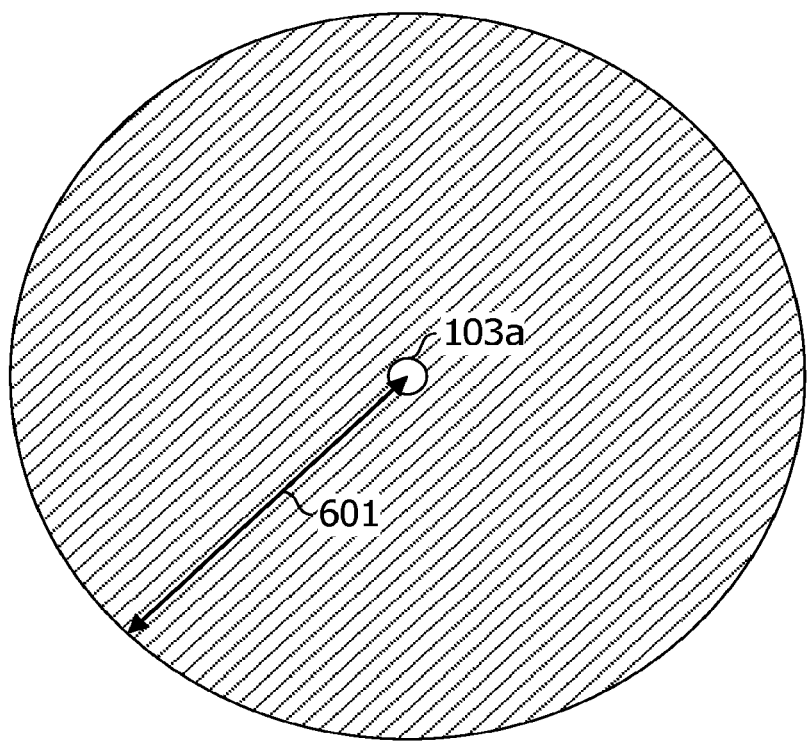
FIG. 6 illustrates an example circular area.

FIG. 6 illustrates an example of the area which may include a user terminal 101 that detects an event occurrence at the same time. FIG. 6 illustrates an example circular area. The area in this example is the inner side of a circle with a radius 601 that is the distance reached by the radio waves of a beacon signal sent from the beacon transmitting device 103a. Multiplying the area of this circle by the density of the user terminal 101 gives an estimated number of user terminals 101 that detect an event occurrence at the same time in this area.

Also, a situation in which a common event occurs at the same time in the user terminals 101 in multiple areas is also possible. In the case of such a situation, the number of user terminals 101 that detect an event at the same time is added together for each area.

Figure 7:
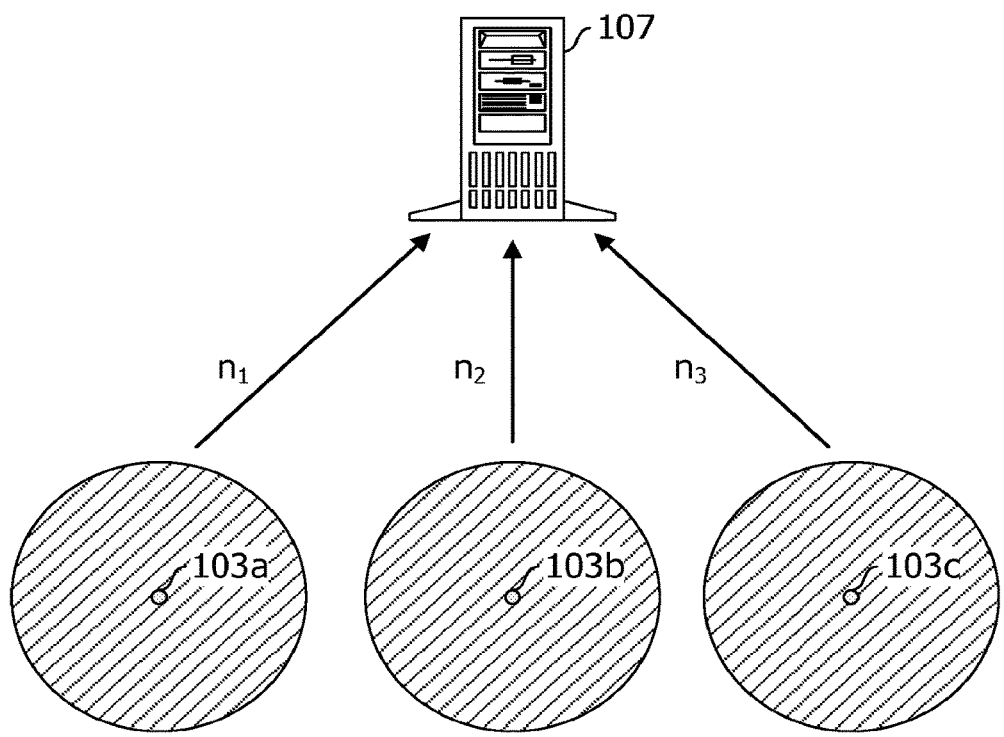
FIG. 7 illustrates the manner in which accesses from user terminals in multiple circular areas to a server concentrate.

FIG. 7 illustrates the manner in which access from the user terminals 101 in multiple circular areas to the server 107 concentrates. In the example illustrated in FIG. 7, let $n_1$ be the number of accesses that occur due to an event based on a beacon signal sent from the beacon transmitting device 103a. Let $n_2$ be the number of accesses that occur due to an event based on a beacon signal sent from the beacon transmitting device 103b. Let $n_3$ be the number of accesses that occur due to an event based on a beacon signal sent from the beacon transmitting device 103c. The total number of accesses may be determined by adding the access numbers $n_1$, $n_2$ and $n_3$.

In addition to the situation in which many user terminals 101 detect an event all at once like this, a situation in which user terminals 101 that have approached the beacon transmitting device 103 each detect an event is also possible. FIG. 8 illustrates the manner in which events occur. The beacon transmitting device 103d illustrated in the upper half of FIG. 8 is assumed to send a beacon signal continuously. A large circle indicates the range reached by radio waves of a beacon signal sent from the beacon transmitting device 103d. At this point, each of the user terminals 101i to 101p is assumed to have content already. The user terminal 101q and the user terminal 101r which have not received content yet are assumed to approach the beacon transmitting device 103d.

As illustrated in the lower half of FIG. 8, when the user terminal 101q and the user terminal 101r enter the range reached by the radio waves of a beacon signal, the user terminal 101q and the user terminal 101r each receive a beacon signal, and detect an occurrence of an event. The user terminal 101q and the user terminal 101r each attempt to access the server 107. Like this, access from multiple user terminals 101 which have approached the beacon transmitting device 103d may concentrate at the same time.

In this embodiment, even in such a situation, concentration of access is avoided. FIGS. 9A and 9B each illustrate an example sequence of event occurrence and access. FIGS. 9A and 9B illustrate an example sequence which distributes access in the example of FIG. 8. The beacon transmitting device 103d transmits a beacon signal continuously (S901). First, when the user terminal 101i approaches the beacon transmitting device 103d, a beacon signal arrives at the user terminal 101i (S903). The user terminal 101i, which has received a beacon signal, determines that an event has occurred based on the beacon signal (S905).

In this example, the user terminal 101i requests for content after an elapse of a short standby time (S907). Upon receiving a request sent from the user terminal 101i (S909), the server 107 distributes the content to the user terminal 101i (S911). The user terminal 101i then receives and stores the content (S913). The discussion proceeds to the sequence of FIG. 9B via a terminal D, a terminal E, a terminal F, a terminal G and a terminal H.

Next, each of the user terminals 101j to 101p receives and stores the content in a similar manner. The user terminal 101q and the user terminal 101r are assumed to simultaneously enter the range reached by the radio waves of a beacon signal. At this point, the user terminal 101q and the user terminal 101r simultaneously receive the beacon signal sent from the beacon transmitting device 103d (S915). The user terminal 101q determines that an event has occurred based on the beacon signal (S917). At the same time, the user terminal 101r also determines that an event has occurred based on the beacon signal (S919).

In this example, the user terminal 101q requests for content after an elapse of a short standby time (S921). Upon receiving a request sent from the user terminal 101q (S923), the server 107 distributes the content to the user terminal 101q (S925). The user terminal 101q then receives and stores the content (S927).

In this example, the user terminal 101r requests for content after staying in standby for a longer time than the user terminal 101q (S929). Upon receiving a request sent from the user terminal 101r (S931), the server 107 distributes the content to the user terminal 101r (S933). The user terminal 101r then receives and stores the content (S935).

Similarly to the case of the above-described situation, concentration of access is avoided by setting the length of standby time by each of the user terminals 101r and q. However, the shape of the area which may include a user terminal 101 that detects an event occurrence at the same time is different from the case of the above-described example.

Figure 10:
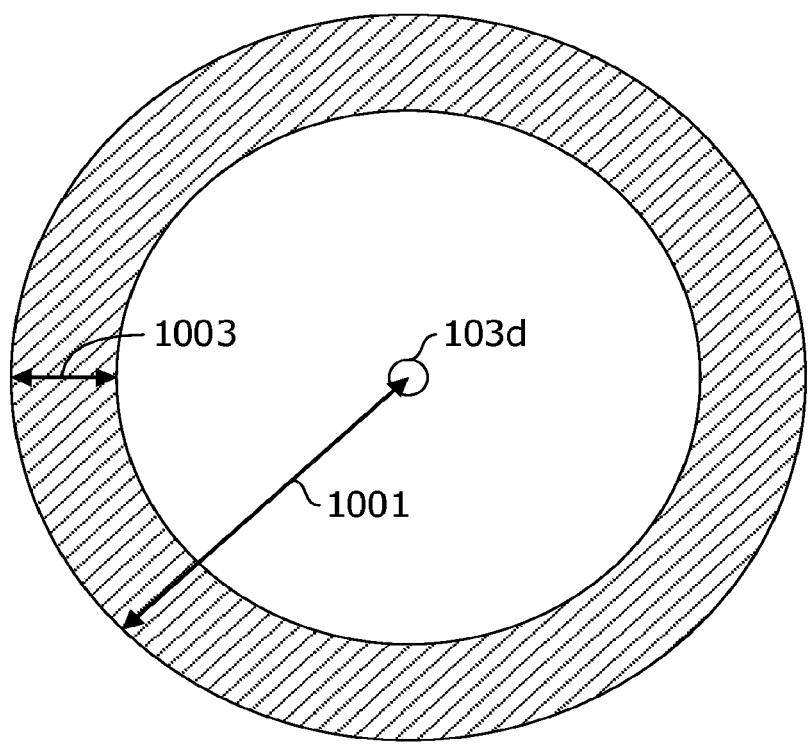
FIG. 10 illustrates an example annular area.

The area in this example is annular as illustrated in FIG. 10. FIG. 10 illustrates an example annular area. The outer side of the ring is divided by a circle with a radius 1001 that is the distance reached by the radio waves of a beacon signal sent from the beacon transmitting device 103d. The ring has a width 1003 corresponding to an entry distance of a user in the reception interval of the user terminal 101. Multiplying the area of this annular area by the density of the user terminal 101 gives an estimated number of user terminals 101 that enter the area at the same time.

Similarly to the case of FIG. 7, a situation in which a common event occurs at the same time in the user terminals 101 in multiple areas is also possible. In the case of such a situation, the number of user terminals 101 that detect an event at the same time is added together for each area.

Figure 11:
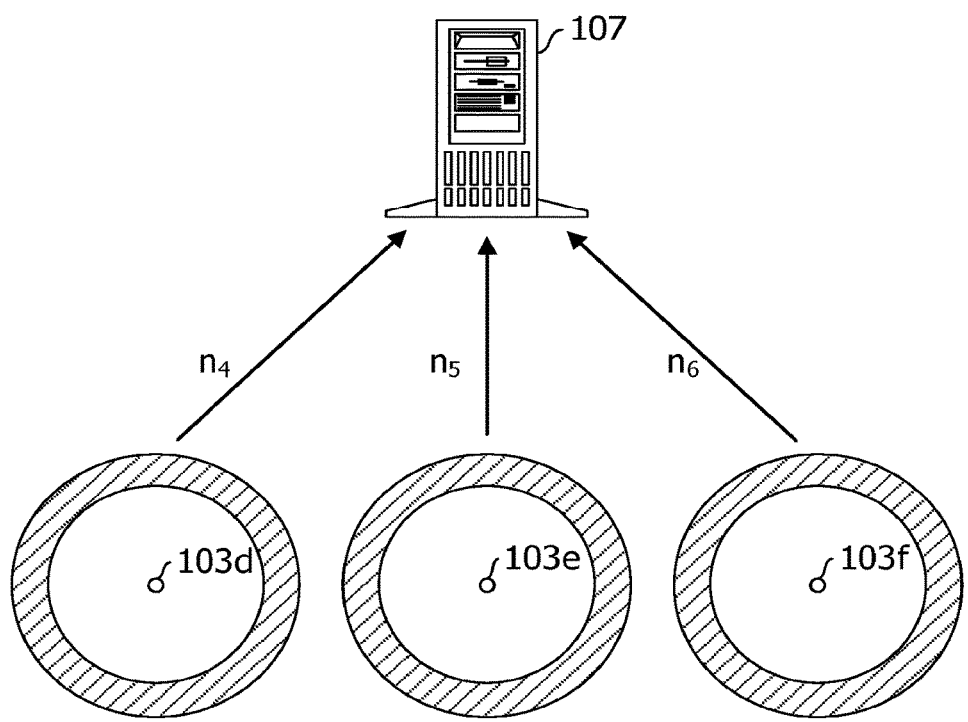
FIG. 11 illustrates the manner in which accesses from user terminals in multiple annular areas to a server concentrate.

FIG. 11 illustrates the manner in which accesses from user terminals in multiple annular areas to a server concentrate. In the example illustrated in FIG. 11, let $n_4$ be the number of accesses that occur due to an event based on a beacon signal sent from the beacon transmitting device 103d. Let $n_5$ be the number of accesses that occur due to an event based on a beacon signal sent from the beacon transmitting device 103e. Let $n_6$ be the number of accesses that occur due to an event based on a beacon signal sent from the beacon transmitting device 103f. The total number of accesses may be determined by adding the access numbers $n_4$, $n_5$ and $n_6$. It is to be noted that both circular areas and annular areas may be present.

Figure 12:
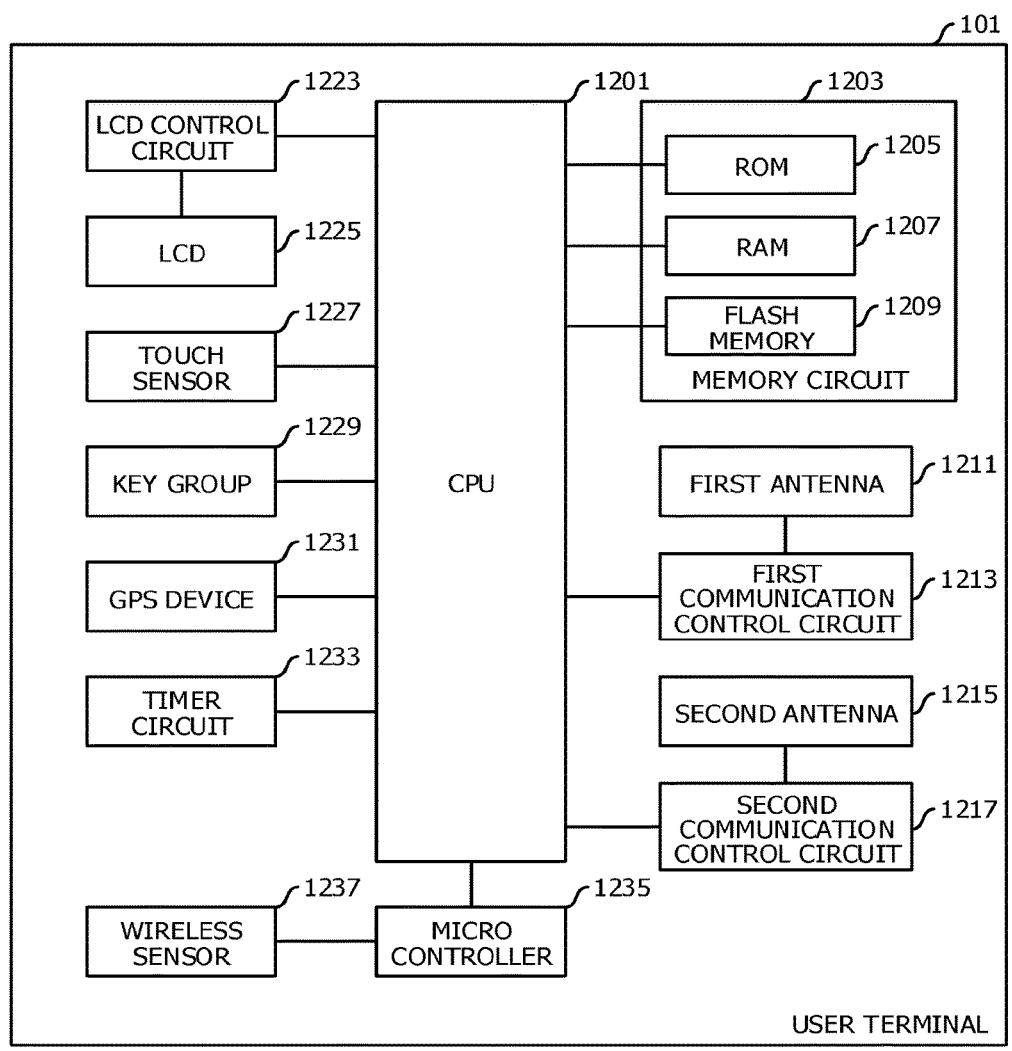
FIG. 12 illustrates an example hardware configuration of a user terminal.

Next, the user terminal 101 will be described. FIG. 12 illustrates an example hardware configuration of the user terminal 101. The user terminal 101 has a central processing unit (CPU) 1201, a memory circuit 1203, a first antenna 1211, a first communication control circuit 1213, a second antenna 1215, a second communication control circuit 1217, a liquid crystal display (LCD) control circuit 1223, an LCD 1225, a touch sensor 1227, a key group 1229, a global positioning system (GPS) device 1231, a timer circuit 1233, a micro controller 1235 and a wireless sensor 1237.

The CPU 1201 executes a program stored in the memory circuit 1203. The memory circuit 1203 has, for instance, a read only memory (ROM) 1205, a random access memory (RAM) 1207 and a flash memory 1209. The ROM 1205 stores a basic program and initial data, for instance. The RAM 1207 includes an area where a program is expanded.

The RAM 1207 also includes an area that stores temporary data. The flash memory 1209 stores programs and user data, for instance, application.

The LCD control circuit 1223 operates a clock circuit with a predetermined operational frequency, and drives the LCD 1225. The LCD 1225 displays various screens. The touch sensor 1227 is, for instance, a panel-shaped sensor disposed on a display surface of the LCD 1225, and receives an instruction by a touch operation. Specifically, the LCD 1225 is used as a touch panel in which the LCD 1225 and the touch sensor 1227 are integrated. Each hard key of the key group 1229 is provided in part of the housing.

The first antenna 1211 receives radio waves in a wireless local area network (LAN) system. The first communication control circuit 1213 controls wireless communication according to the operating frequency in a wireless LAN system. The second antenna 1215 receives radio waves in the first wireless communication system (for instance, Bluetooth (registered trademark) Low Energy) system. The second communication control circuit 1217 controls wireless communication according to the operating frequency in the first wireless communication system. The first wireless communication system is a communication system related to near field communication. The second antenna 1215 and the second communication control circuit 1217 receive a beacon signal in the first wireless communication system.

The micro controller 1235 is coupled to the CPU 1201. A sensor is coupled to the micro controller 1235. The micro controller 1235 controls the sensor. The CPU 1201 obtains a result of measurement of the sensor via the micro controller 1235. In this example, the wireless sensor 1237 is coupled. The wireless sensor 1237 includes an antenna that receives radio waves in the second wireless communication system, and a circuit that controls communication by the second wireless communication system. The second wireless communication system is a communication system related to near field communication. The wireless sensor 1237 receives a beacon signal in the second wireless communication system.

The user terminal 101 is, for instance, a smartphone. However, the user terminal 101 may be a mobile phone unit other than a smartphone. Alternatively, the user terminal 101 may be a portable electronic device other than a mobile phone unit. This embodiment may be applicable to, for instance, a wearable terminal such as a wrist watch terminal and a glasses terminal, a tablet terminal, a game machine, a pedometer, a recorder, a music player, a camera, an image player, a television broadcast receiver, a radio broadcast receiver, a controller, an electronic clock, an electronic dictionary, an electronic translator, a radio, a GPS transmitter, a measuring instrument, a portable electronic device such as a health support device or a medical device.

Next, a module of software will be described. FIG. 13 illustrates an example module configuration of a user terminal. The user terminal 101 has a driver 1301a, driver 1301b, a detection unit 1303, a start unit 1305, a thread processing unit 1307, a transmission unit 1315, a reception unit 1317, a service memory unit 1331, an event memory unit 1333, an area memory unit 1335, a parameter memory unit 1337 and a content storage unit 1339.

The driver 1301a is a driver that controls the first wireless communication system. The driver 1301b is a driver that controls the second wireless communication system. The detection unit 1303 detects an occurrence of an event. The start unit 1305 starts thread processing.

The thread processing unit 1307 performs thread processing according to an event. The thread processing unit 1307 has a first calculation unit 1309, a second calculation unit 1311, an access unit 1313 and a display processing unit 1314.

The first calculation unit 1309 calculates the number of user terminals 101 that are estimated to receive a beacon signal for the first time from the beacon transmitting device 103 related to a common service at the same time. The second calculation unit 1311 calculates a standby time of the user terminal 101 before access is made. The access unit 1313 accesses the server 107 after staying in standby. The display processing unit 1314 displays a message.

The transmission unit 1315 transmits various data. The reception unit 1317 receives various data.

The service memory unit 1331 stores a service table. The service table will be described later using FIG. 14. The service table is assumed to be stored before the later-described main processing is performed.

The event memory unit 1333 stores an event table. The event table will be described later using FIG. 15. The event table is assumed to be stored the later-described main processing is performed.

The area memory unit 1335 stores an area table. The area table will be described later using FIG. 16. The area table is assumed to be stored before the later-described main processing is performed.

The parameter storage unit 1337 stores a parameter table. The parameter table will be described later using FIG. 17. The parameter table is assumed to be stored before the later-described main processing is performed.

The content storage unit 1339 stores a received content.

The driver 1301a, the driver 1301b, the detection unit 1303, the start unit 1305, the thread processing unit 1307, the first calculation unit 1309, the second calculation unit 1311, the access unit 1313, the display processing unit 1314, the transmission unit 1315 and the reception unit 1317 described above are implemented by using hardware resources (for instance, FIG. 12) and a program that causes a processor to execute the processing described below.

The service memory unit 1331, the event memory unit 1333, the area memory unit 1335, the parameter memory unit 1337, and the content storage unit 1339 described above are implemented by using hardware resources (for instance, FIG. 12).

FIG. 14 illustrates an example service table. A service table is provided for each service. The header of the service table in this example has a field in which a service name is stored, a field in which a service ID is stored, a field in which a response speed of the server 107 is stored, a field in which an upper limit of standby time is stored, a field in which a priority index of the relevant terminal is stored and a field in which the number of servers is stored.

The service name and the service ID each identify the service. The response speed of the server 107 is the number of requests which are stably processed per unit of time (second in this example) by the server 107 that provides the service. The upper limit of standby time is the longest standby time which is allowed as a condition for the service. The priority index of a terminal is a value which illustrates a priority assigned to the user terminal 101. In this example, the priority index is a value between 0 and 1 inclusive. A larger priority index indicates a higher priority. The number of servers is the number of the servers 107 prepared for the service.

The service table also has a record corresponding to server definition. The record is provided for each of the number of servers. The record includes a field in which a priority order of the server 107 is stored, a field in which a server ID is stored, and a field in which an IP address is stored. It is to be noted that for the response speed of each server 107 included in the service table, when the response speeds are different between the servers for record storage, the response speed may be stored in a corresponding record.

The server 107 with a higher priority order processes an access from the user terminal 101 preferentially. The server ID identifies the server 107. The IP address is a destination when data is transmitted to the server 107.

FIG. 15 illustrates an example event table. An event table is provided for each event. The header of the event table has a field in which an event name is stored, a field in which an event ID is stored, a field in which a service ID is stored and a field in which event occurrence conditions are stored.

The event name and the event ID each identify the event. The service ID identifies service corresponding to the event. The field in which event occurrence conditions are stored includes a field in which a logical operator is stored, a field in which the number of combination is stored, and records corresponding to signal detection conditions.

The logical operator indicates one of OR or AND by which multiple signal detection conditions are combined. The number of combination is the number of signal detection conditions to be combined.

The records corresponding to signal detection conditions each has a field in which a communication system is stored, a field in which a signal value is stored, and a field in which a transmission device ID is stored.

The communication system identifies a communication system which provides a beacon signal. The signal value is a value included in the beacon signal. The transmission device ID identifies a beacon transmitting device 103 that sends a beacon signal. The transmission device ID is included in the beacon signal. It is to be noted that the signal value may be the transmission device ID.

FIG. 16 illustrates an example area table. An area table is provided for each beacon transmitting device 103. The area table has a field in which an area name is stored, a field in which an area ID is stored, a field in which a communication system is stored, a field in which a transmission device ID is stored, a field in which a detected style is stored, a field in which a radio distance is stored, and a field in which a density is stored.

The area name and the area ID each identify the area. The communication system identifies the type of the beacon signal sent to the area. The transmission device ID identifies the beacon transmitting device 103 that sends a beacon signal to the area. The detected style indicates the type of detection of an event occurrence in the area. Specifically, the detected style is one of a concurrent type which has been described using FIGS. 3 to 7 and a continuous type which has been described using FIGS. 8 to 11. The radio distance is the distance reached in a state where radio waves of a beacon signal sent from the beacon transmitting device 103 is received by the user terminal 101. The density is the number of user terminals 101 attempting to access the beacon transmitting device 103 per unit of area.

FIG. 17 illustrates an example parameter table. In the parameter table, parameters used in the later-described processing are set. The parameter table in this example has a field in which a reception interval is stored, and a field in which a movement speed is stored. The reception interval is an interval at which the user terminal 101 receives a beacon signal. The movement speed is the speed at which the user terminal 101 moves. The movement speed corresponds to the walking speed of a user, for instance.

The reception interval in this example is common in any case. However, the reception interval may be stored in association with the service ID. Alternatively, the reception interval may be stored in association with the event ID. Alternatively, the reception interval may be stored in association with the area ID.

The movement speed in this example is common in any case. However, the movement speed may be stored in association with the service ID. Alternatively, the movement speed may be stored in association with the event ID. Alternatively, the movement speed may be stored in association with the area ID.

Figure 18:
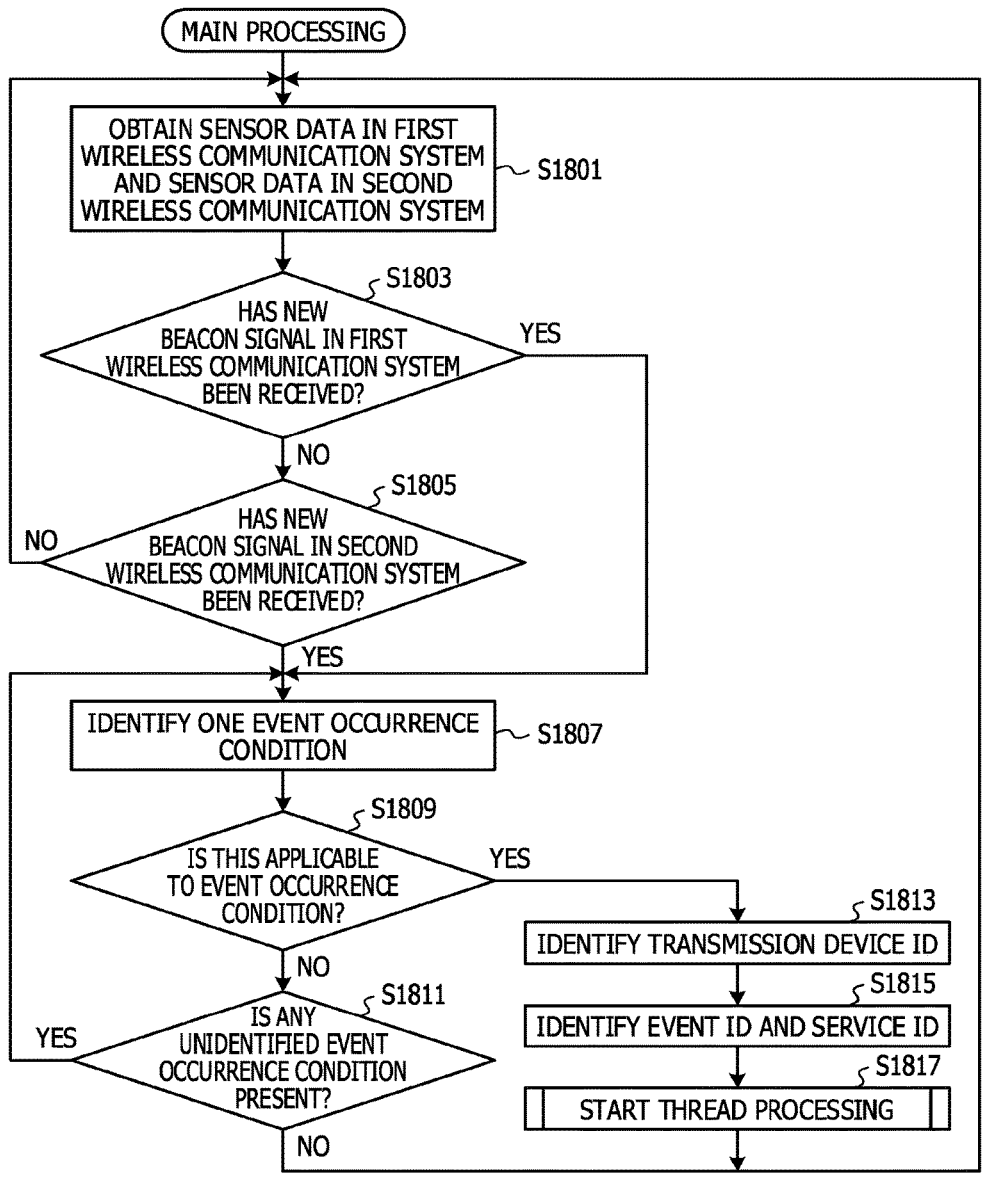
FIG. 18 illustrates a main processing flow.

Next, the processing in the user terminal 101 will be described. FIG. 18 illustrates the main processing flow. The detection unit 1303 obtains sensor data of the first wireless communication system from the driver 1301a, and obtains sensor data of the second wireless communication system from the driver 1301b (S1801).

The detection unit 1303 determines whether or not a new beacon signal in the first wireless communication system has been received based on the sensor data of the first wireless communication system (S1803). When it is determined that a new beacon signal in the first wireless communication system has been received, the flow proceeds to the processing of S1807.

On the other hand, when it is determined a new beacon signal in the first wireless communication system has not been received, the detection unit 1303 determines whether or not a new beacon signal in the second wireless communication system has been received based on the sensor data of the second wireless communication system (S1805). When it is determined that a new beacon signal in the second wireless communication system has been received, the flow proceeds to the processing of S1807.

On the other hand, when it is determined a new beacon signal in the second wireless communication system has not been received, the flow returns to the processing illustrated in S1801, and the above-described processing is repeated.

In S1807, the detection unit 1303 identifies one event occurrence condition. Specifically, the detection unit 1303 identifies one event table stored in the event memory unit 1333.

The detection unit 1303 determines whether or not the new beacon signal of the first wireless communication system or the new beacon signal of the second wireless communication system is applicable to the event occurrence condition (S1809).

For instance, when the communication system and the signal value match, the detection unit 1303 determines that the beacon signal satisfies the signal detection condition. When the signal value other than the transmission device ID is to be compared, it may be determined that the beacon signal satisfies the signal detection condition when the communication system, the signal value, and the transmission device ID match.

In the case where the logical operator is OR, when the communication system and the signal value match in either one of the signal detection conditions, the detection unit 1303 determines the event occurrence condition is satisfied. In the case where the logical operator is AND, when the communication system and the signal value match in each of the signal detection conditions, the detection unit 1303 determines the event occurrence condition is satisfied.

When it is determined that the new beacon signal of the first wireless communication system or the new beacon signal of the second wireless communication system is not applicable to the event occurrence condition, the detection unit 1303 determines whether or not any unidentified event occurrence condition is present (S1811). When it is determined that an unidentified event occurrence condition is present, the flow returns to the processing illustrated in S1807, and the above-described processing is repeated.

On the other hand, when it is determined that unidentified event occurrence condition is not present, the flow returns to the processing illustrated in S1801, and the above-described processing is repeated.

Returning to the description of the determination in S1809, in S1809, when it is determined that the new beacon signal of the first wireless communication system or the new beacon signal of the second wireless communication system is applicable to the event occurrence condition, the detection unit 1303 identifies the transmission device ID (S1813). Specifically, the detection unit 1303 reads the transmission device ID included in the matched signal detection condition. When the signal value is the transmission device ID, the signal value may be identified.

In addition, the detection unit 1303 identifies the event ID and the service ID (S1815). Specifically, the detection unit 1303 reads the event ID and the service ID from an event table that includes the matched signal detection condition.

The start unit 1305 then starts the thread processing by passing the transmission device ID, the event ID and the service ID as arguments (S1817). When the thread processing is started, the flow returns to the processing illustrated in S1801 without waiting for completion of the thread processing, and the above-described processing is repeated.

Figure 19:
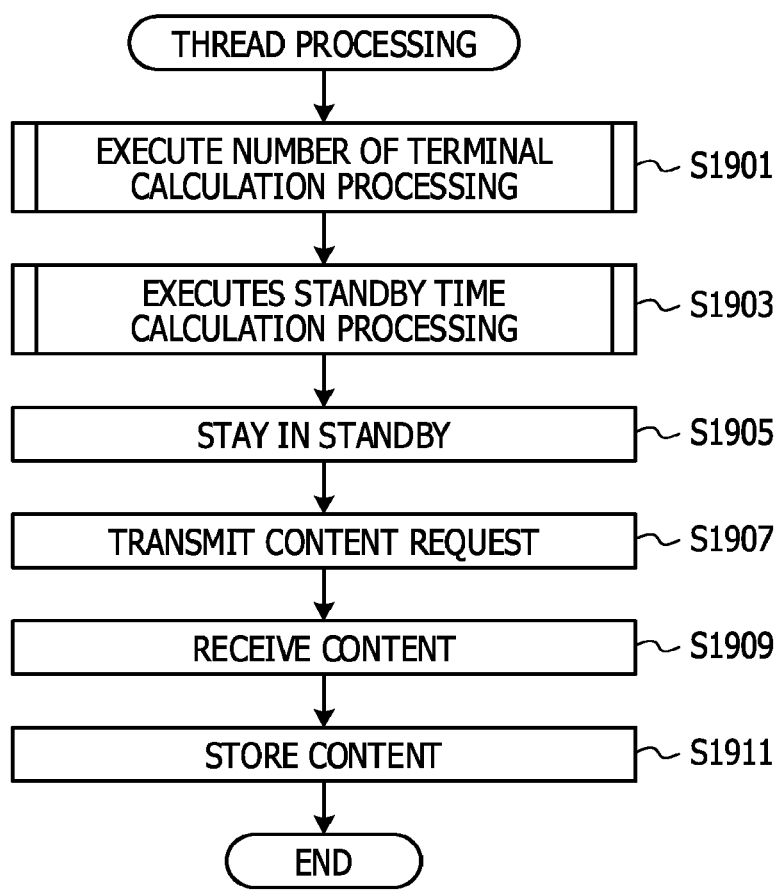
FIG. 19 illustrates a thread processing flow.

Next, the thread processing will be described. FIG. 19 illustrates a thread processing flow. The first calculation unit 1309 executes number of terminal calculation processing (S1901). In the number of terminal calculation processing, the number of user terminals 101 that are estimated to receive a beacon signal for the first time from the beacon transmitting device 103 related to a common service at the same time is calculated.

Figure 20:
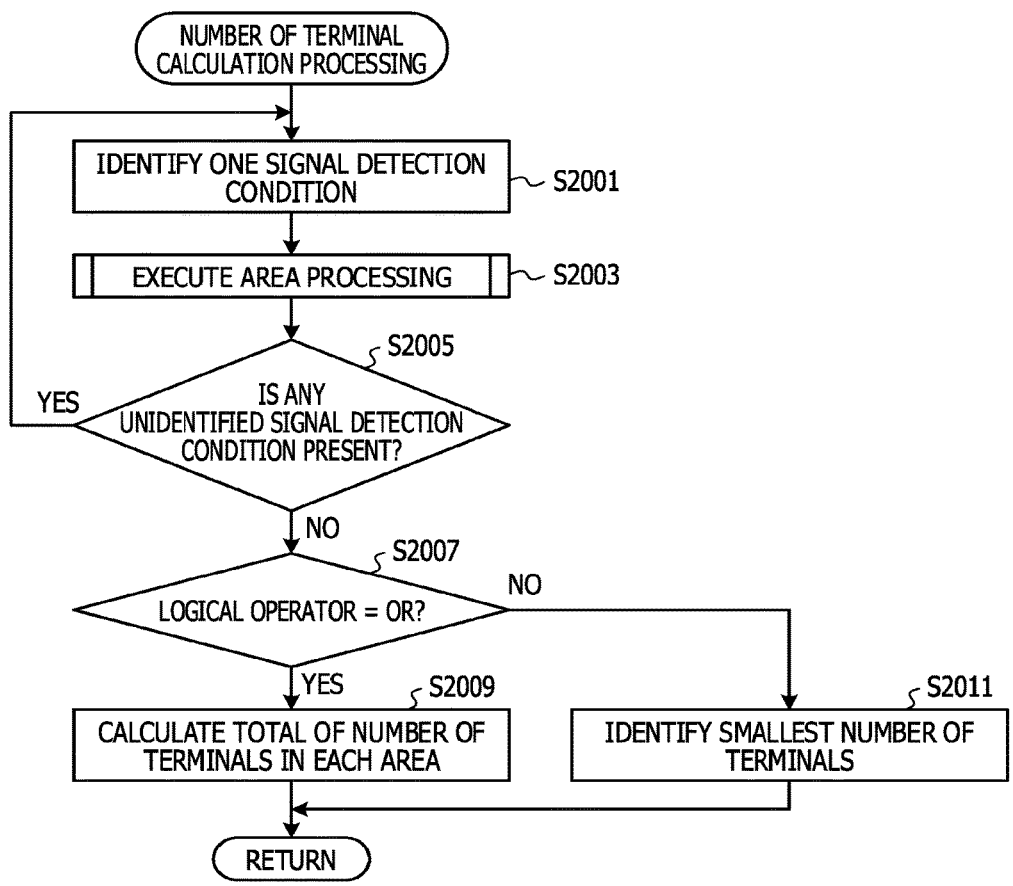
FIG. 20 illustrates a number of terminal calculation processing flow.

FIG. 20 illustrates a number of terminal calculation processing flow. The first calculation unit 1309 identifies one signal detection condition in the event table identified by the event ID passed as an argument (S2001). The order of identification is arbitrary.

The first calculation unit 1309 executes area processing (S2003). Specifically, the first calculation unit 1309 calculates an estimated number of user terminals 101 for the area identified by the transmission device ID included in the identified signal detection condition.

Figure 21:
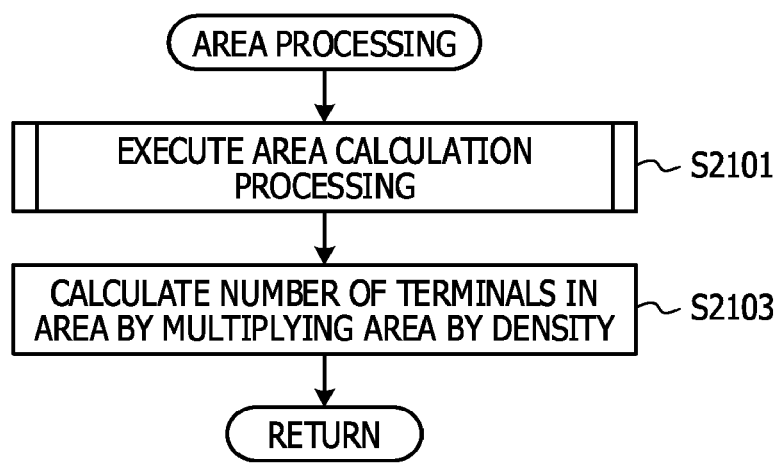
FIG. 21 illustrates an area processing flow.

FIG. 21 illustrates an area processing flow. The first calculation unit 1309 executes area calculation processing (S2101). The area calculation processing calculates the area of an area which may include any user terminal 101 that is estimated to receive a beacon signal for the first time from the beacon transmitting device 103 identified by the transmission device ID.

Figure 22:
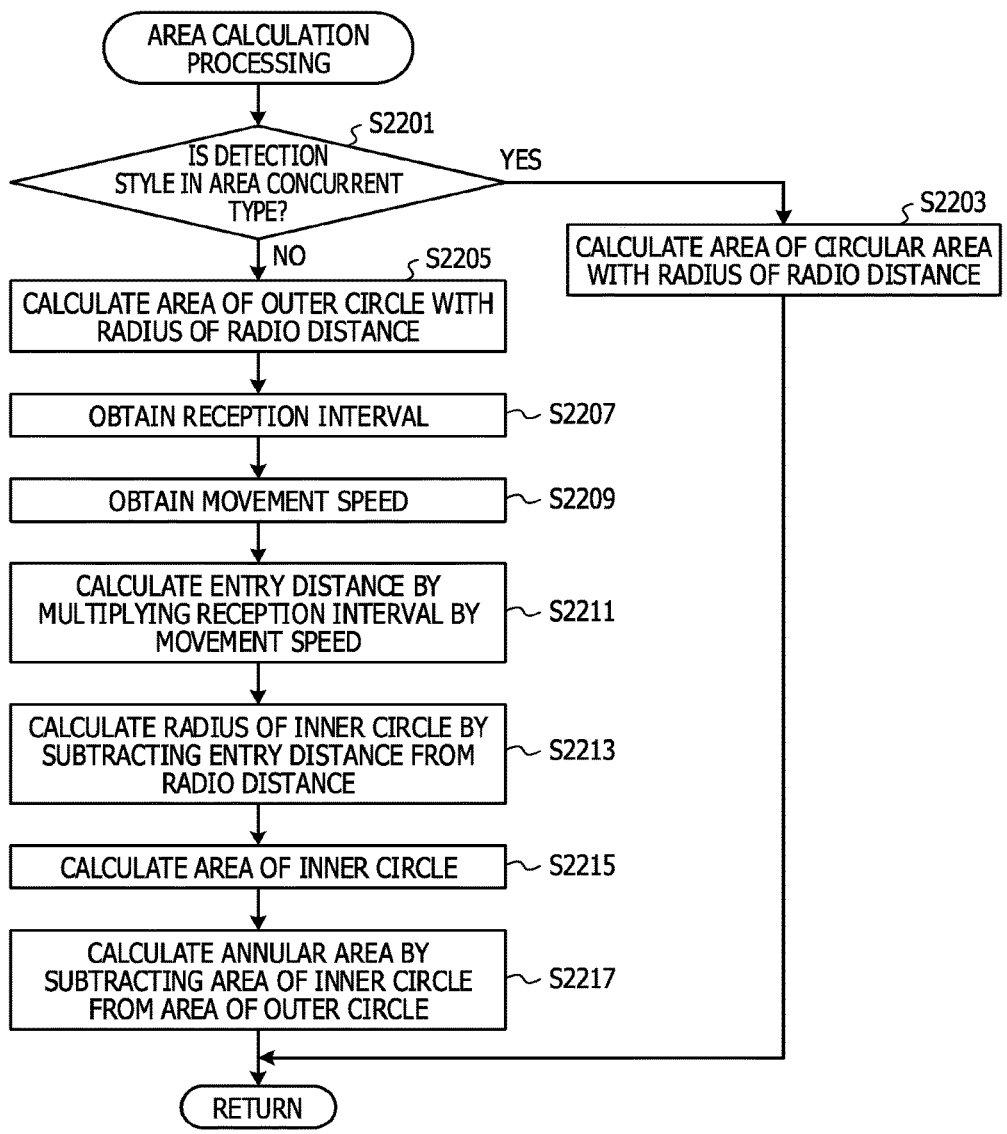
FIG. 22 illustrates an area calculation processing flow.

FIG. 22 illustrates an area calculation processing flow. The first calculation unit 1309 determines whether or not the detection form stored in the area table identified by the transmission device ID is the concurrent type (S2201).

When it is determined that the detection form is the concurrent type, the first calculation unit 1309 calculates the area of a circular area with a radius that is the radio distance stored in the area table (S2203). Then the area calculation processing is completed.

On the other hand, when it is determined that the detection form is not the concurrent type, in other words, when it is determined that the detection form is the continuous type, the first calculation unit 1309 calculates the area of the outer circle with a radius that is the radio distance stored in the area table (S2205).

The first calculation unit 1309 obtains a reception interval from the parameter table (S2207). When the reception interval is stored in association with the service ID, the first calculation unit 1309 may obtain a reception interval corresponding to the service ID. When the reception interval is stored in association with the event ID, the first calculation unit 1309 may obtain a reception interval corresponding to the event ID. When the reception interval is stored in association with the area ID, the first calculation unit 1309 may obtain a reception interval corresponding to the area ID.

Next, the first calculation unit 1309 obtains a movement speed (S2209). When the movement speed is stored in association with the service ID, the first calculation unit 1309 may obtain a movement speed corresponding to the service ID. When the movement speed is stored in association with the event ID, the first calculation unit 1309 may obtain a movement speed corresponding to the event ID. When the movement speed is stored in association with the area ID, the first calculation unit 1309 may obtain a movement speed corresponding to the area ID.

The first calculation unit 1309 calculates an entry distance by multiplying the reception interval by the movement speed (S2211). The first calculation unit 1309 calculates the radius of the inner circle by subtracting the entry distance from the radio distance (S2213). The first calculation unit 1309 then calculates the area of the inner circle based on the calculated radius (S2215).

The first calculation unit 1309 calculates the annular area by subtracting the area of the inner circle from the area of the outer circle (S2217). When the area calculation processing is completed, the area processing as the calling source processing resumes.

Returning to the description of FIG. 21, the first calculation unit 1309 calculates the number of terminals in the area by multiplying the area calculated in S2101 by a density (S2103). At this point, the density is obtained from the area table identified by the transmission device ID. When the area processing is completed, the number of terminal calculation processing as the calling source processing resumes.

Returning to the description of FIG. 20, the first calculation unit 1309 determines whether or not any unidentified signal detection condition is present (S2005). When it is determined that an unidentified signal detection condition is present, the flow returns to the processing illustrated in S2001, and the above-described processing is repeated.

On the other hand, when it is determined that an unidentified signal detection condition is not present, the first calculation unit 1309 determines whether or not the logical operator is OR (S2007). When it is determined that the logical operator is OR, the first calculation unit 1309 calculates the total of the number of terminals in each area (S2009).

On the other hand, when it is determined that the logical operator is not OR, in other words, when the logical operator is AND, the first calculation unit 1309 identifies the smallest number of terminals among the numbers of terminals of all areas (S2011). In administrative operation in which the logical operator is set AND, multiple areas are likely to be completely overlapped, and thus it is often appropriate to identify the smallest number of terminals. Also, in consideration of the case where multiple areas are partially overlapped, position information is added to each area and an overlapped portion in the area is identified, then the number of terminals may be calculated by multiplying the area of the overlapped portion by the density. When the number of terminal calculation processing is completed, the thread processing as the calling source processing resumes.

Returning to the description of FIG. 19, the second calculation unit 1311 executes standby time calculation processing (S1903). In the standby time calculation processing, a standby time of the user terminal 101 before access is made is calculated.

Figure 23:
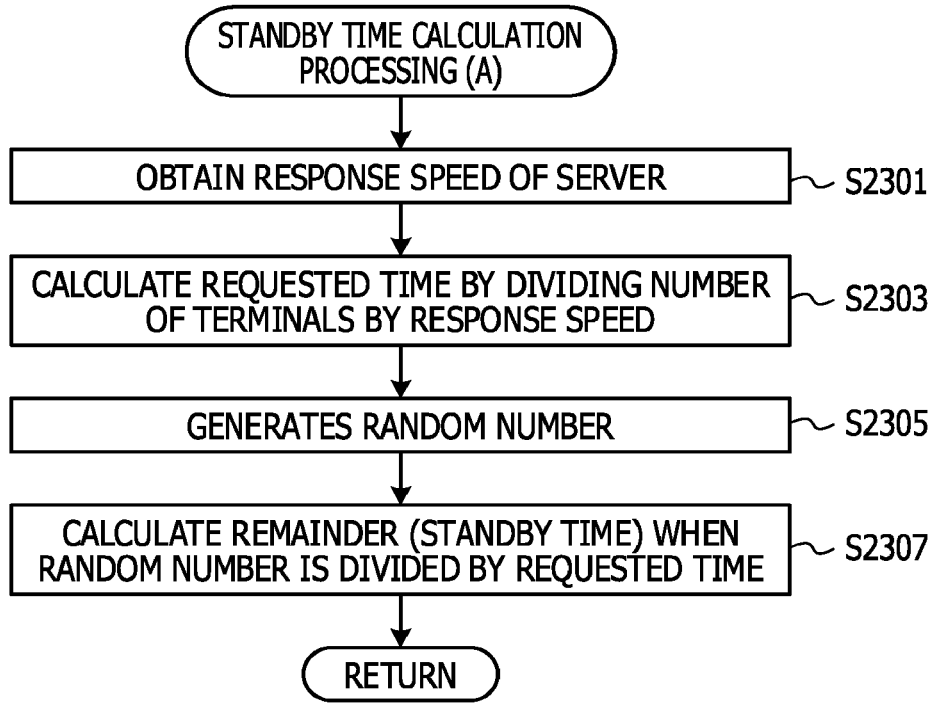
FIG. 23 illustrates a standby time calculation processing (A) flow.

In this embodiment, the standby time calculation processing (A) is executed. FIG. 23 illustrates a standby time calculation processing (A) flow. The standby time calculation processing (A) has the precondition that one set of server 107 is prepared and no upper limit is set to the standby time.

The first calculation unit 1309 obtains a response speed of the server 107 stored in the service table identified by the service ID (S2301). The first calculation unit 1309 calculates a requested time by dividing the number of terminals calculated in S1901 by the response speed (S2303). The requested time is a time requested when access for the number of terminals is processed at the response speed. In this case, each user terminal 101 accesses to the server 107 within the requested time. In other words, the requested time calculated here corresponds to the access period length.

The user terminal 101 identifies a random time within the requested time by the following processing. The first calculation unit 1309 generates a random number (S2305). The first calculation unit 1309 calculates the remainder when the random number is divided by the requested time (S2307). The remainder gives the standby time. When the standby time calculation processing (A) is completed, the thread processing as the calling source processing resumes.

Returning to the description of FIG. 19, the access unit 1313 stays in standby (S1905). That is, the access unit 1313 waits for elapse of the standby time. When the standby time elapses, the access unit 1313 transmits a content request to the server 107 via the transmission unit 1315 (S1907).

Next, the access unit 1313 receives content via the reception unit 1317 (S1909). The access unit 1313 stores the received content in the content storage unit 1339 (S1911). The thread processing is then completed.

It is to be noted that since the access point 105 also sends a beacon signal, the access point 105 may be regarded as the beacon transmitting device 103. Alternatively, this embodiment may be applied to the area determination by global positioning system (GPS) instead of near field wireless communication system.

In this embodiment, it is possible to make a standby time for shifting the time of access more appropriate.

Also, in this embodiment, the standby time is calculated based on the response speed of an apparatus, and thus it is easy to avoid an excessive load of the apparatus.

Also, in this embodiment, it is possible to accurately estimate the number of terminals according to the magnitude of an output of the beacon transmission device 103.

Also, in this embodiment, when the user terminals 101 near the beacon transmission device 103 make access all at once, it is possible to more accurately estimate the number of the user terminals 101.

Also, in this embodiment, when the user terminals 101, which have approached the beacon transmission device 103, make access, it is possible to more accurately estimate the number of the user terminals 101 which have approached the beacon transmission device 103 at the same time.

Also, in this embodiment, when the logical operator is OR, it is possible to cope with the case where the user terminals 101 in a wide range or the user terminals 101 at a remote place attempt to make access at the same time.

Also, in this embodiment, when the logical operator is AND, it is possible to cope with the case where user terminals 101 close to either one of multiple beacon transmission devices 103 attempt to make access.

Second Embodiment

In this embodiment, the standby time calculation processing when multiple user terminals 101 are prepared and an upper limit is set to the standby time will be described.

In this embodiment, standby time calculation processing (B) instead of the standby time calculation processing (A) is executed. FIGS. 24, 26, 29 and 32 illustrate the standby time calculation processing (B) flow. The processing of S2401 is the same as the processing of S2301 in the standby time calculation processing (A). The processing of S2403 is the same as the processing of S2303 in the standby time calculation processing (A).

The second calculation unit 1311 determines whether or not the requested time exceeds the upper limit of the standby time (S2405). At this point, the upper limit of the standby time is read from the service table identified by the service ID.

Figure 25:
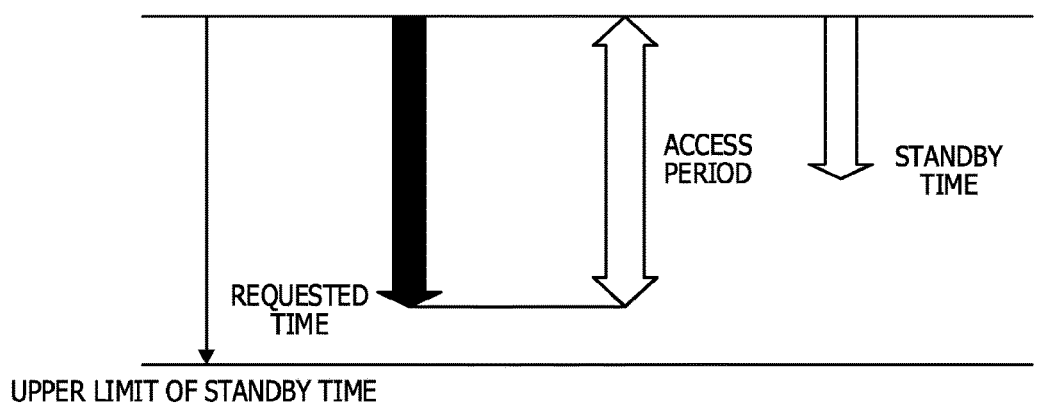
FIG. 25 illustrates an access period when one set of server is sufficient.

When the requested time does not exceed the upper limit of the standby time, one set of server 107 is sufficient to handle accesses. FIG. 25 illustrates an access period when one set of server is sufficient. As illustrated, the access period length is the same as the requested time. The user terminal 101 sets the standby time up to a certain point within the access period.

Figure 24:
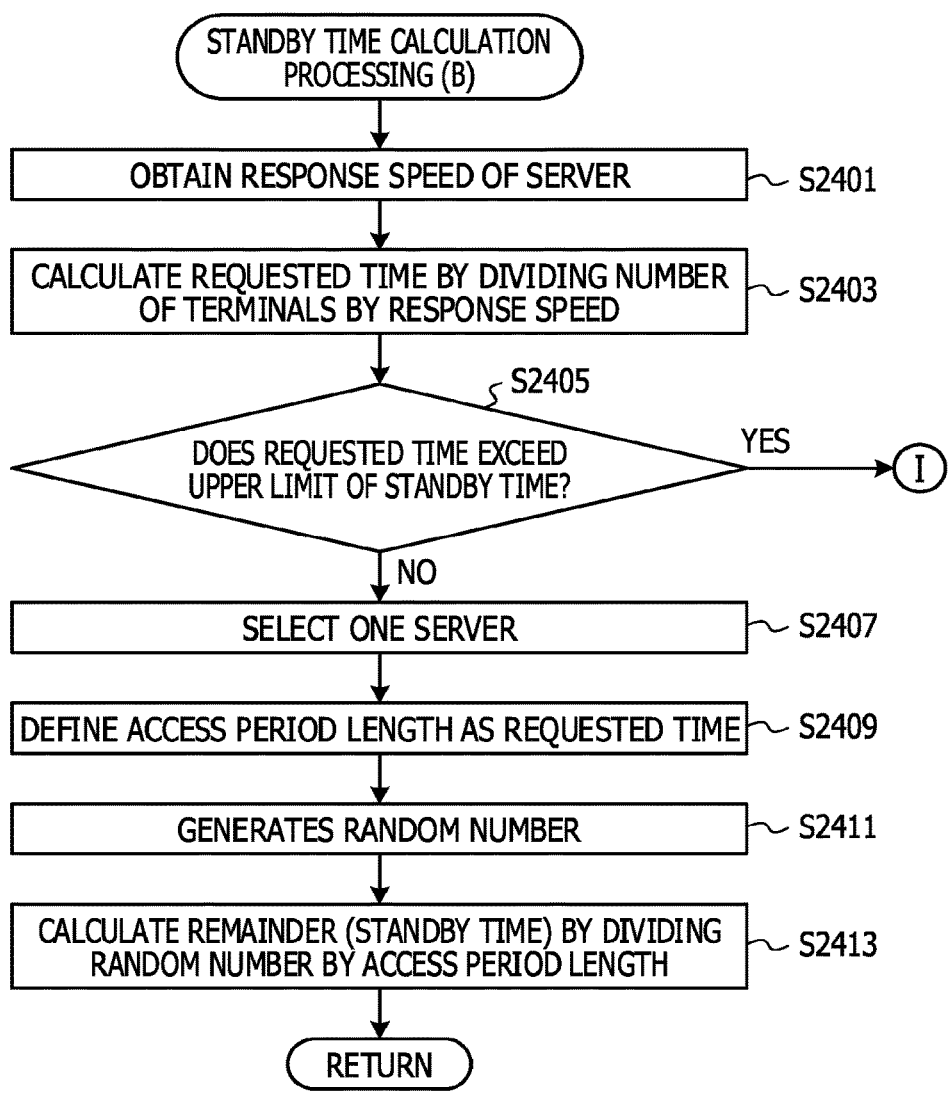
FIG. 24 illustrates a standby time calculation processing (B) flow.

Returning to the description of FIG. 24, when it is determined that the requested time does not exceed the upper limit of the standby time, the second calculation unit 1311 selects one server 107 (S2407). Specifically, the second calculation unit 1311 selects a server definition having a priority order of 1 in the service table identified by the service ID. The second calculation unit 1311 then defines the access period length as the requested time (S2409).

The second calculation unit 1311 generates a random number (S2411). The second calculation unit 1311 calculates the remainder by dividing the random number by the access period length (S2413). The remainder gives the standby time. When the standby time calculation processing (B) is completed, the thread processing as the calling source processing resumes.

Figure 26:
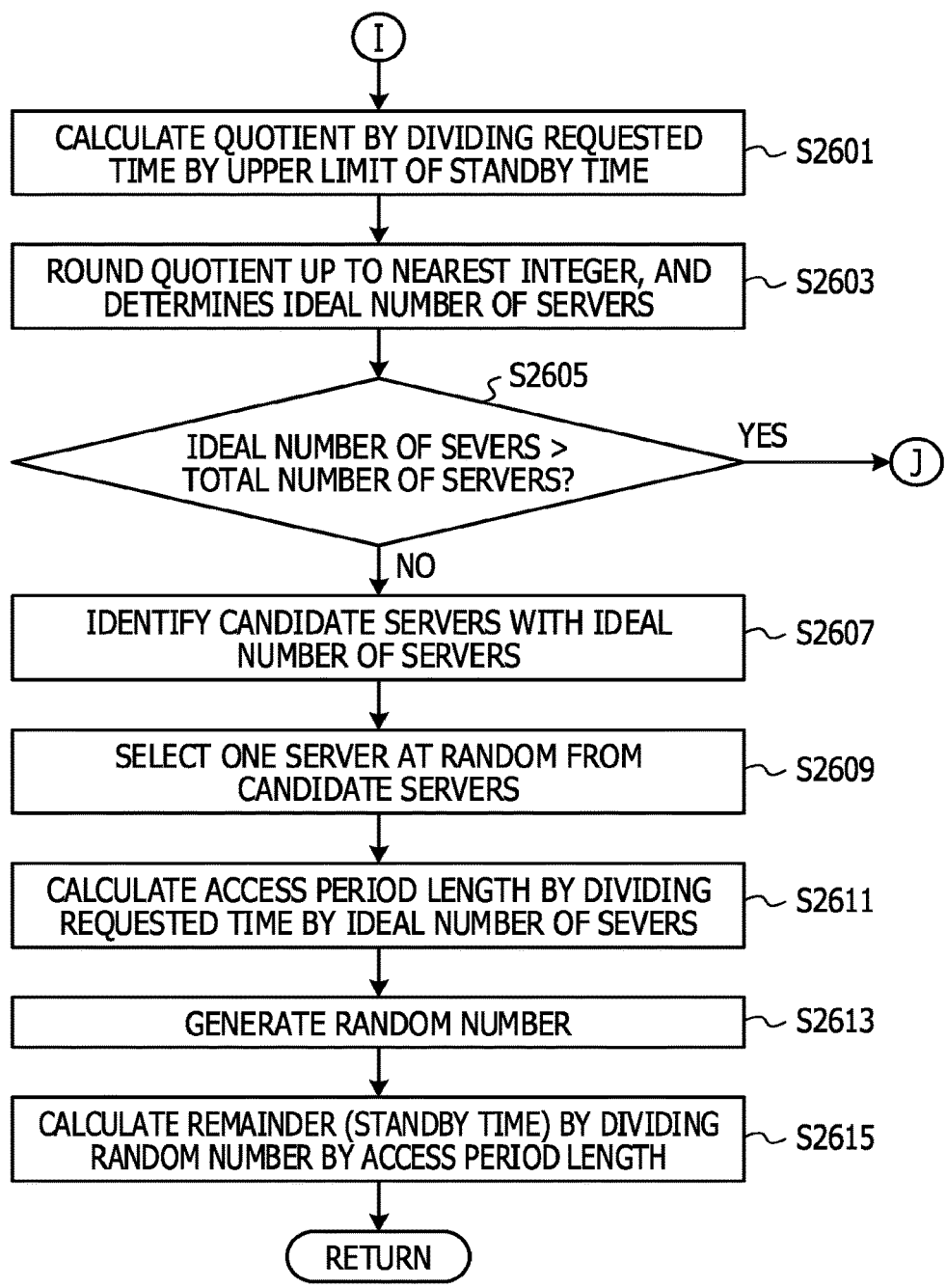
FIG. 26 illustrates a standby time calculation processing (B) flow.

Returning to the description of the determination in S2405, when it is determined in S2405 that the requested time exceeds the upper limit of the standby time, the flow proceeds to the processing of S2601 illustrated in FIG. 26 via the terminal I.

Proceeding to description of FIG. 26, when the requested time exceeds the upper limit, accesses from the user terminal 101 are processed by multiple servers 107. In other words, the user terminal 101 accesses to one of the multiple servers 107.

Thus, the second calculation unit 1311 calculates the number of servers 107 in order to process an expected access within the upper limit of the standby time. First, the second calculation unit 1311 calculates the quotient by dividing the requested time by the upper limit of the standby time (S2601). The second calculation unit 1311 then rounds the quotient up to the nearest integer, and determines an ideal number of servers 107 (S2603).

The second calculation unit 1311 determines whether or not the ideal number of servers exceeds the total number of servers 107 (S2605).

Figure 27:
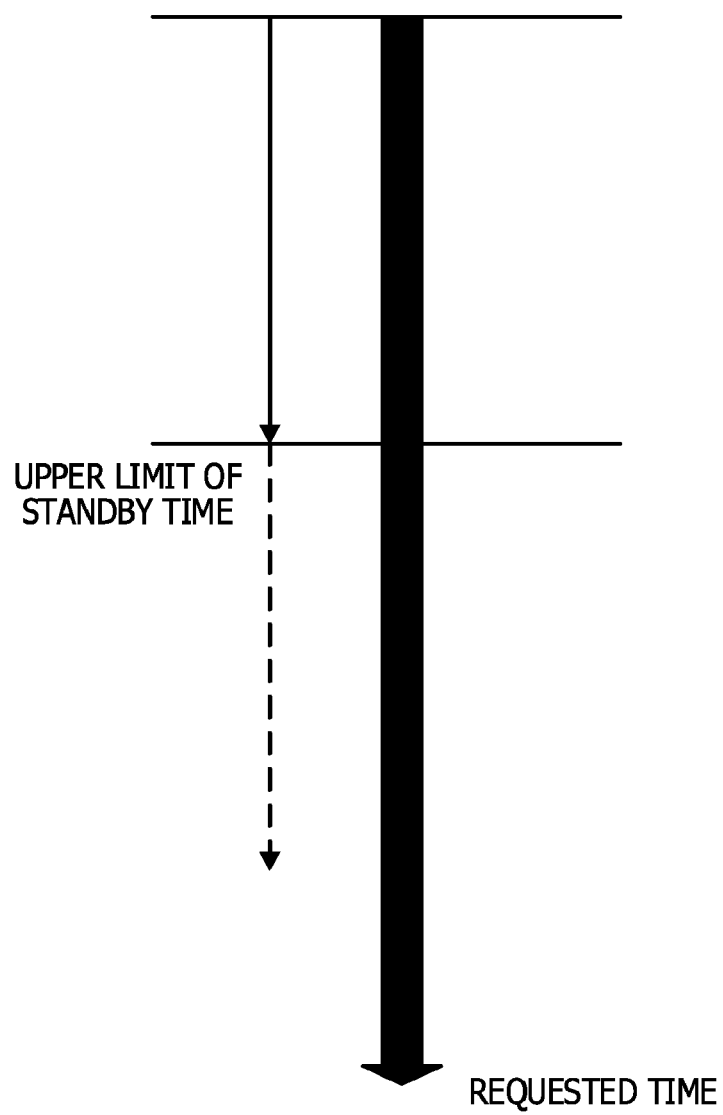
FIG. 27 illustrates an example in which an ideal number of servers does not exceed the total number of servers.

FIG. 27 illustrates an example in which the ideal number of servers does not exceed the total number of servers. For reference, a dashed line arrow indicates the same time length as the upper limit of the standby time. In this example, the total number of servers 107 is assumed to be three. In the illustrated example, the requested time is approximately 2.5 times the upper limit of the standby time. Thus the ideal number of servers is three. In this example, the ideal number of servers matches the total number of servers 107. Therefore, accesses from the user terminals 101 are processed by three sets of servers 107.

Figure 28:
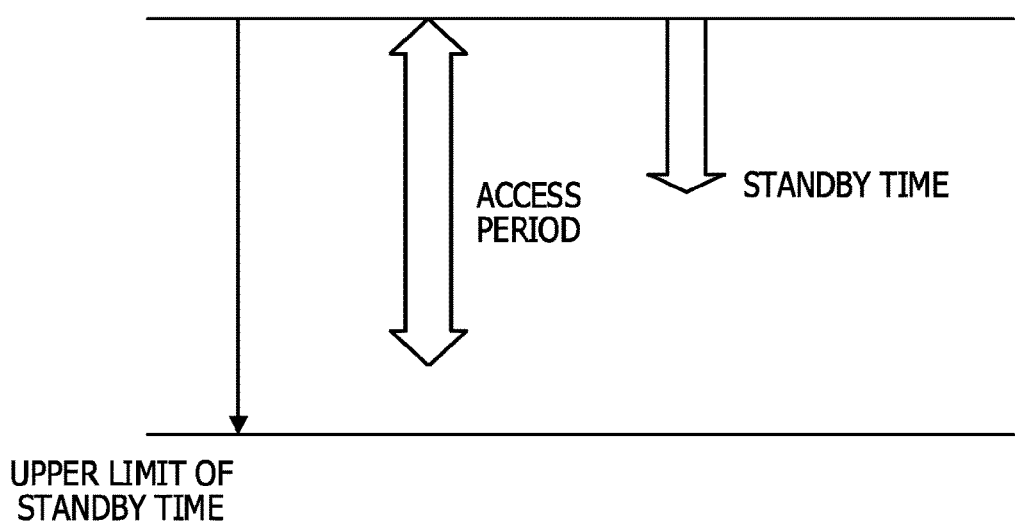
FIG. 28 illustrates an access period when an ideal number of servers does not exceed the total number of servers.

FIG. 28 illustrates an access period in this case. FIG. 28 illustrates an access period when the ideal number of servers does not exceed the total number of servers. As described above, when accesses from the user terminals 101 are shared by three sets of servers 107, the access period length is allowed to be smaller than the upper limit of the standby time. Specifically, the access period length is calculated by dividing the requested time by the number of servers 107.

Returning to the description of FIG. 26, when it is determined in S2605 that the ideal number of servers does not exceed the total number of servers 107, the second calculation unit 1311 identifies candidate servers with the ideal number of servers (S2607). The second calculation unit 1311 selects one server 107 at random from the candidate servers (S2609). Specifically, the second calculation unit 1311 selects one of server definitions up to the priority order corresponding to the ideal number of servers in the service table identified by the service ID. The selected server 107 is the destination of the access.

The second calculation unit 1311 calculates the access period length by dividing the requested time by the ideal number of servers (S2611). The second calculation unit 1311 generates a random number (S2613). The second calculation unit 1311 calculates the remainder by dividing the random number by the access period length (S2615). The remainder gives the standby time. When the standby time calculation processing (B) is completed, the thread processing as the calling source processing resumes.

Figure 29:
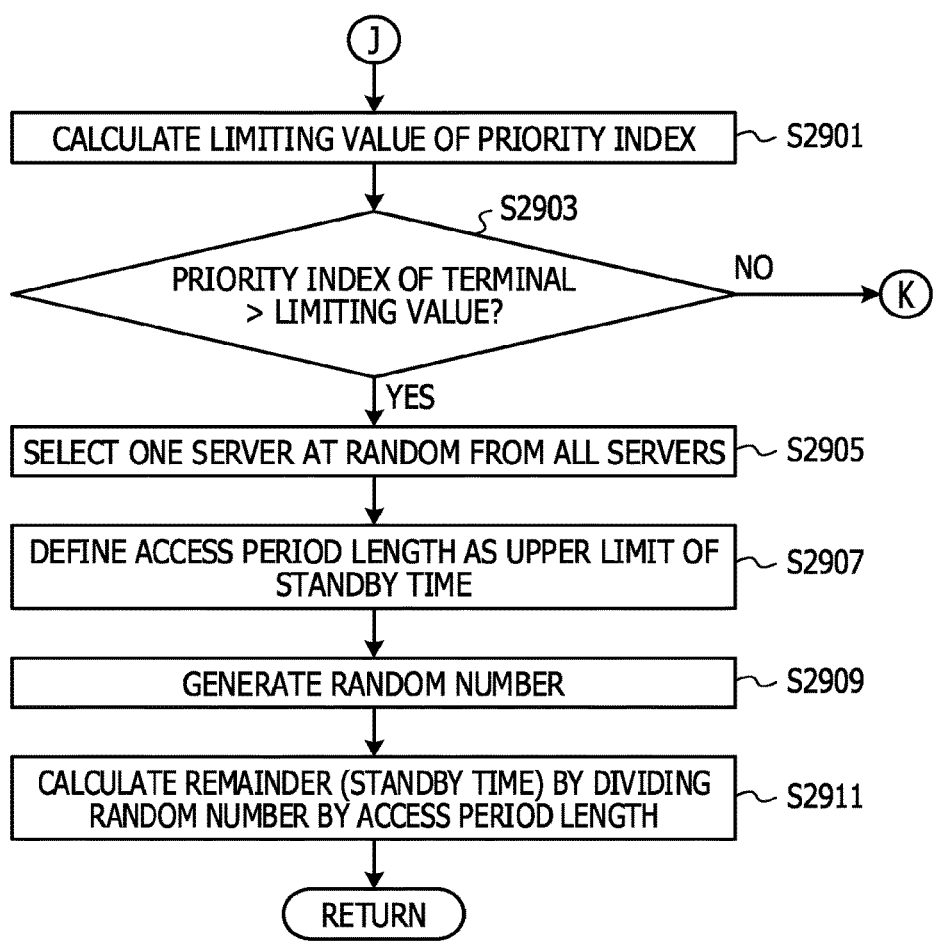
FIG. 29 illustrates a standby time calculation processing (B) flow.

Returning to the description of the determination in S2605, when it is determined that the ideal number of servers exceeds the total number of servers 107, the flow proceeds to the processing of S2901 illustrated in FIG. 29 via the terminal J.

Proceeding to description of FIG. 29, the second calculation unit 1311 calculates a limiting value of the priority index (S2901). The limiting value is a threshold for determining whether or not the user terminal 101 accesses to the server 107 preferentially. When the priority index assigned to the user terminal 101 exceeds the limiting value, the user terminal 101 accesses to the server 107 preferentially.

Figure 30:
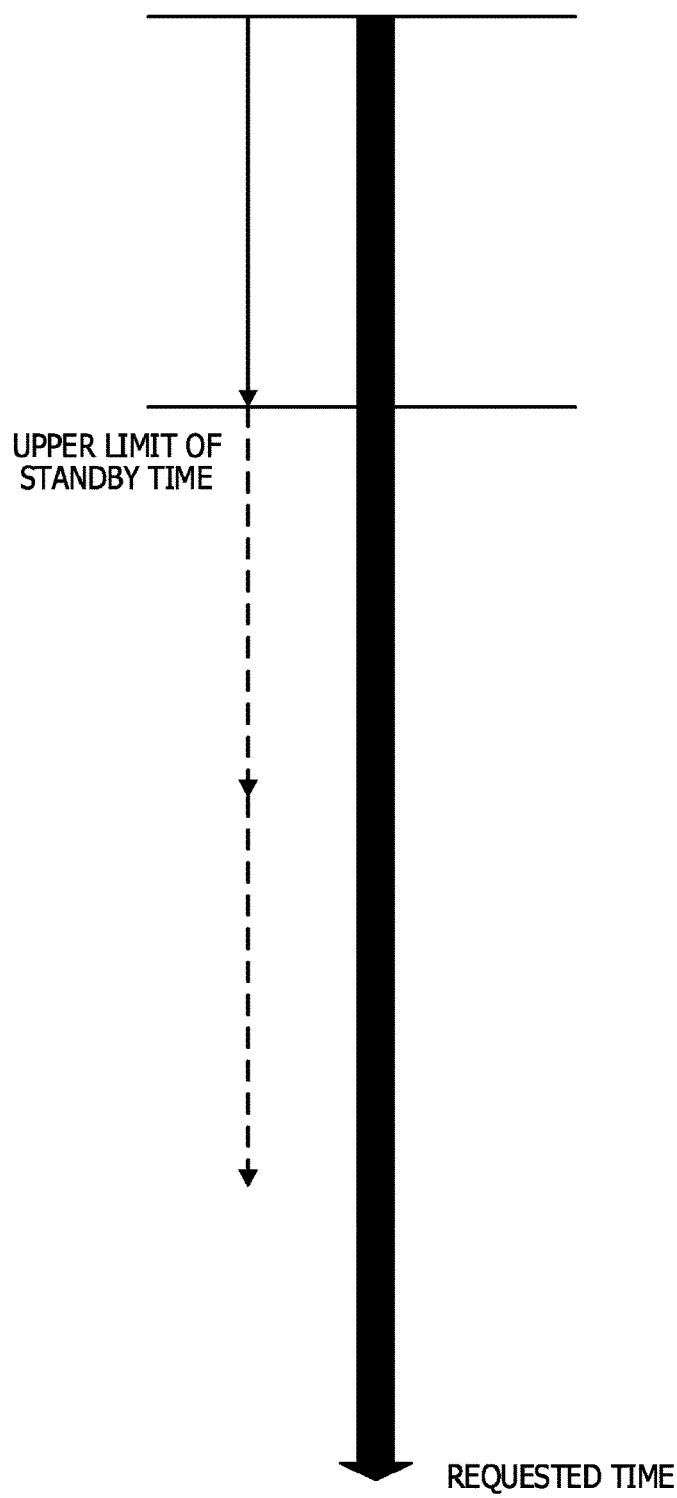
FIG. 30 illustrates an example in which an ideal number of servers exceeds the total number of servers.

In the following, the outline of preferential access will be described using FIGS. 30 and 31. FIG. 30 illustrates an example in which the ideal number of servers exceeds the total number of servers. A dashed line arrow in FIG. 30 indicates the same time length as the upper limit of the standby time. Since the requested time is approximately 3.75 times the upper limit of the standby time. Thus the ideal number of servers is four. Therefore, the ideal number of servers exceeds three which is the total number of servers 107. In this case, it is not possible to process expected accesses by the prepared servers 107 within the upper limit of the standby time.

Thus, the user terminal 101 with priority assigned accesses up to the upper limit of the standby time. In contrast, the user terminal 101 with no priority assigned makes access after the upper limit of the standby time.

Figure 31:
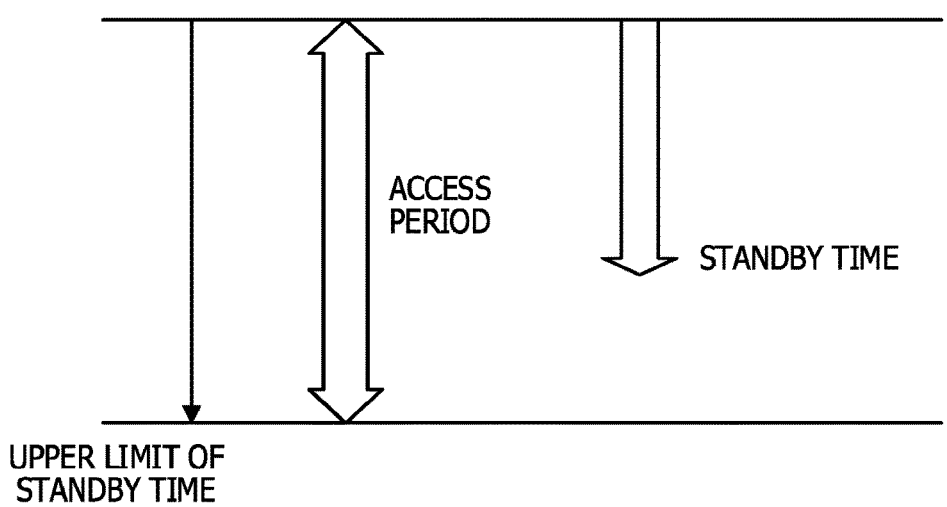
FIG. 31 illustrates an access period when the priority index of a terminal exceeds a limiting value.

FIG. 31 illustrates an access period when the priority index of the terminal exceeds the limiting value. FIG. 31 illustrates the access period of a user terminal 101 with priority assigned, in other words, the access period of a user terminal 101 in which the priority index of the terminal exceeds the limiting value. In the case of the user terminal 101 with priority assigned, the access period is the same as the upper limit of the standby time. The user terminal 101 stays in standby up to a certain point within the access period.

Returning to the description of FIG. 29, in S2901, the second calculation unit 1311 calculates the limiting value of the priority index by 1−(upper limit of standby time×total number of serves 107/requested time). It is to be noted that the limiting value in this example matches the ratio of the user terminals 101 with no priority assigned.

The second calculation unit 1311 determines whether or not the priority index of the terminal exceeds the limiting value (S2903). At this point, the priority index of the terminal is read from the service table identified by the service ID.

When it is determined that the priority index of the terminal exceeds the limiting value, in other words, when it is determined that priority is assigned, the second calculation unit 1311 selects one server 107 at random from the servers 107 prepared (S2905). The selected server 107 is the destination of the access. The second calculation unit 1311 defines the access period length as the upper limit of the standby time (S2907).

The second calculation unit 1311 generates a random number (S2909). The second calculation unit 1311 calculates the remainder by dividing the random number by the access period length (S2911). The remainder gives the standby time. When the standby time calculation processing (B) is completed, the thread processing as the calling source processing resumes.

Figure 32:
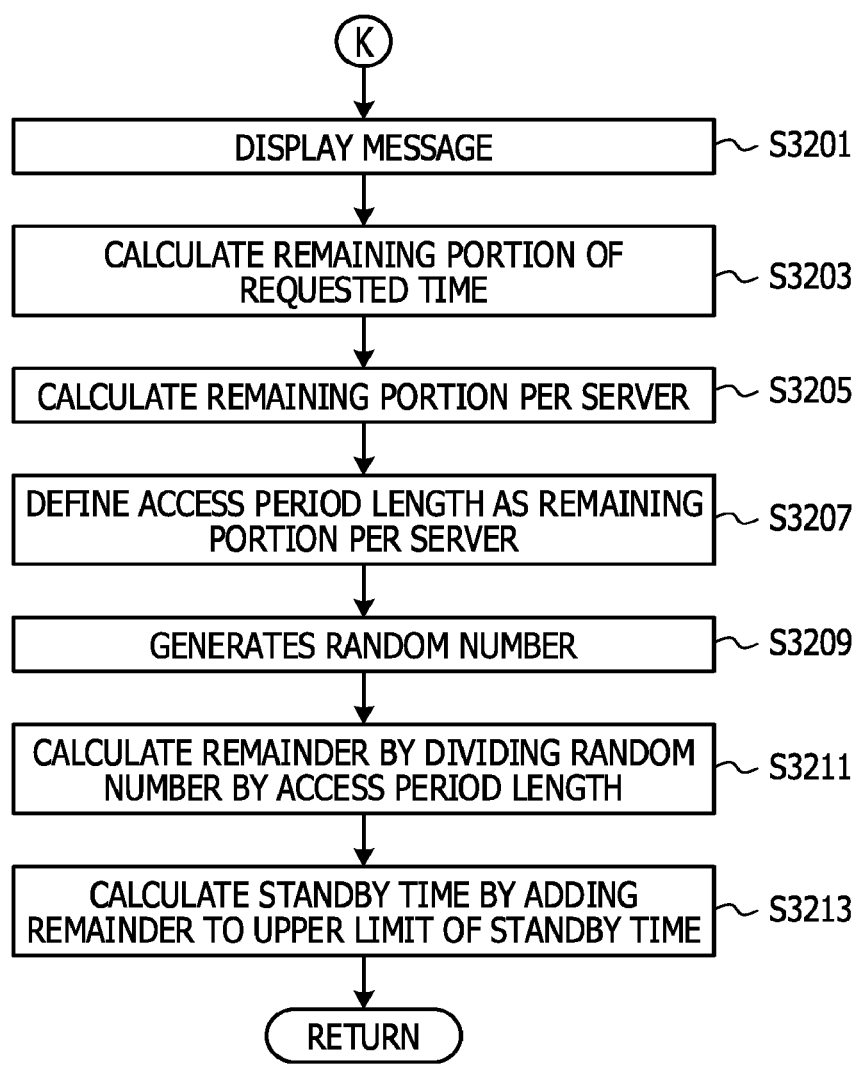
FIG. 32 illustrates a standby time calculation processing (B) flow.

Returning to the description of the determination in S2903, when it is determined that the priority index of the terminal does not exceed the limiting value, in other words, when it is determined that priority is not assigned, the flow proceeds to the processing of S3201 illustrated in FIG. 32 via the terminal K.

Proceeding to description of FIG. 32, the display processing unit 1314 displays a message telling that delay in server access occurs (S3201). This processing may be omitted.

Here, a method of determining the access period in the user terminals 101 with no priority assigned will be described. From a time point corresponding to the upper limit of the standby time till the end of the time taken for these user terminals 101 to complete the access is called the remaining portion of the requested time. The remaining portion of the requested time is calculated by (requested time−upper limit of standby time×total number of servers 107). The remaining portion of the requested time in the example illustrated in FIG. 30 is approximately 0.75 times the upper limit of the standby time.

Figure 33:
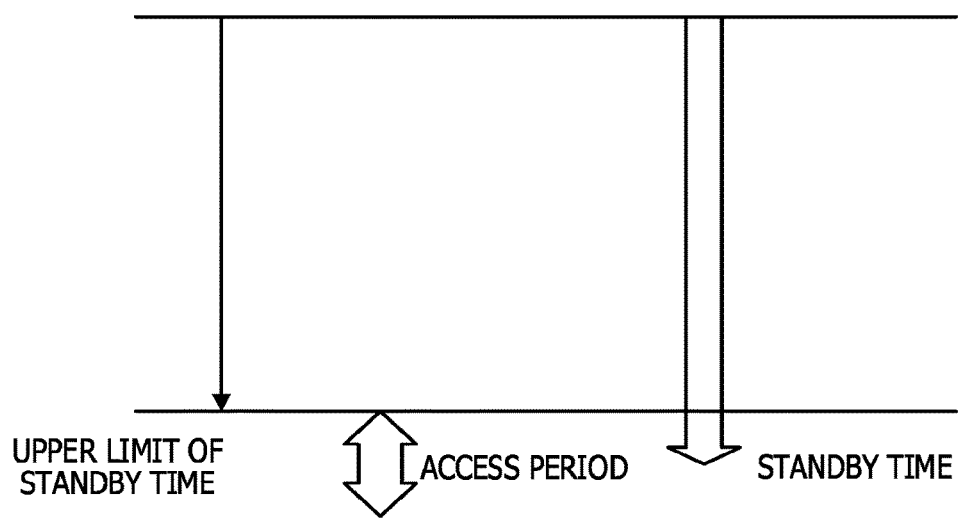
FIG. 33 illustrates an access period when the priority index of a terminal does not exceed a limiting value.

The remaining portion of the requested time is shared by the total number of servers 107. FIG. 33 illustrates an access period when the priority index of the terminal does not exceed the limiting value. FIG. 33 illustrates an example of the access period based on the remaining portion of the requested time. The access period in the user terminal 101 with no priority assigned has a start point at a time point corresponding to the upper limit of the standby time. The access period length is calculated by (remaining portion of requested time/total number of servers 107). In this example, the access period length is approximately 0.25 times the upper limit of the standby time.

Returning to the description of FIG. 32, the second calculation unit 1311 calculates the remaining portion of requested time as described above (S3203). The second calculation unit 1311 calculates the remaining portion per server by dividing the remaining portion of the requested time by the total number of servers 107 (S3205). The second calculation unit 1311 defines the access period length as the remaining portion per server (S3207).

The second calculation unit 1311 generates a random number (S3209). The second calculation unit 1311 calculates the remainder by dividing the random number by the access period length (S3211). The second calculation unit 1311 calculates the standby time by adding the remainder to the upper limit of the standby time (S3213). When the standby time calculation processing (B) is completed, the thread processing as the calling source processing resumes.

According to this embodiment, the upper limit of the standby time is provided, and thus it is easy to avoid inappropriate standby as a service.

Although the embodiments of the present disclosure have been described above, the present disclosure is not limited to this. For instance, the above-described functional block configuration may not match a program module configuration.

The configuration of each memory area described above is an example, and is not necessarily the aforementioned configuration. Furthermore, as long as the result of processing is not changed, in a processing flow, the order of processing may be changed or multiple processing may be concurrently executed.

The following is a summary of the embodiments of the present disclosure described above.

The device according to this embodiment includes: (A) a first calculation unit configured to, when a signal as a trigger for occurrence of an event is received, calculate the number of devices which are estimated to access at the same time to an apparatus that provides a service corresponding to the event; (B) a second calculation unit configured to calculate a standby time from an occurrence time of the event based on the number of devices and the condition related to the service or the apparatus; and (C) an access unit configured to access to the apparatus after staying in standby from the occurrence time of the event until the standby time elapses.

With this configuration, it is possible to make the standby time for shifting the time of access more appropriate.

In addition, the condition may include the response speed in the apparatus.

With this configuration, it is easy to avoid an excessive load of the apparatus.

In addition, the condition may include the upper limit of the standby time.

With this configuration, it is easy to avoid inappropriate standby as a service.

In addition, the first calculation unit may calculate the number of devices based on the distance reached by the signal sent from the transmission device.

With this configuration, it is possible to more accurately estimate the number of devices according to the magnitude of an output of the transmission device.

In addition, the first calculation unit may calculate the number of devices based on the area of a circular area with a radius that is the distance reached by the signal.

With this configuration, when the devices near the transmission device make access all at once, it is possible to more accurately estimate the number of devices.

In addition, the first calculation unit may calculate the number of devices based on the area of an annular area with an outer circle radius that is the distance reached by the signal.

With this configuration, when the devices, which have approached the transmission device, make access, it is possible to more accurately estimate the number of the devices which have approached at the same time.

In addition, the device may include a detection unit configured to detect occurrence of an event when one of the signal sent from each of multiple transmission devices is received. The first calculation unit may total the number of devices calculated based on the distance reached by the signal sent from each of the multiple transmission devices.

With this configuration, it is possible to cope with the case where the devices in a wide range or the devices at a remote place attempt to make access at the same time.

In addition, the device may include a detection unit configured to detect occurrence of an event when the signal sent from each of the multiple transmission devices is received at the same time. Also, the first calculation unit may identify a minimum number of devices out of the number of devices calculated based on the distance reached by the signal sent from each of the multiple transmission devices.

With this configuration, it is possible to cope with the case where the devices close to either one of the multiple transmission devices attempt to make access.

It is to be noted that it is possible to create a program for causing a processor to perform the processing in the above-described information processing apparatus. The program may be stored in a computer-readable storage medium or storage device such as a flexible disk, a CD-ROM, a magneto-optical disk, a semiconductor memory, a hard disk. It is to be noted that in general, an intermediate processing result is temporarily stored in a memory device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A device comprising:
a memory; and
a processor coupled to the memory and configured to:
calculate a number of devices which are estimated to access at a same time to an apparatus that provides a service corresponding to an event when a signal as a trigger for occurrence of the event is received,
calculate a standby time from an occurrence time of the event based on the number of devices and a condition related to the service or the apparatus, and
access to the apparatus after staying in standby from the occurrence time of the event until the standby time elapses.

2. The device according to claim 1, wherein the condition includes a response speed in the apparatus.

3. The device according to claim 1, wherein the condition includes an upper limit of the standby time.

4. The device according to claim 1, wherein the processor is configured to:

calculate the number of devices based on a distance reached by the signal sent from a transmission device.

5. The device according to claim 4, wherein the processor is configured to:

calculate the number of devices based on an area of a circular area with a radius that is the distance reached by the signal.

6. The device according to claim 4, wherein the processor is configured to:

calculate the number of devices based on an area of an annular area with an outer circle radius that is the distance reached by the signal.

7. The device according to claim 4, wherein the processor is configured to:

detect occurrence of the event when one of the signal sent from each of a plurality of transmission devices is received, and total the number of devices calculated based on the distance reached by the signal sent from each of the plurality of transmission devices.

8. The device according to claim 4, wherein the processor is configured to:

detect occurrence of the event when the signal sent from each of the plurality of transmission devices is received at a same time, and identify a minimum number of devices out of the number of devices calculated based on the distance reached by the signal sent from each of the plurality of transmission devices.

9. A method executed by a device, the method comprising:

calculating a number of devices which are estimated to access at a same time to an apparatus that provides a service corresponding to an event when a signal as a trigger for occurrence of the event is received;

calculating a standby time from an occurrence time of the event based on the number of devices and a condition related to the service or the apparatus; and accessing, by a processor, to the apparatus after staying in standby from the occurrence time of the event until the standby time elapses.

10. The method according to claim 9, wherein the condition includes a response speed in the apparatus.

11. The method according to claim 9, wherein the condition includes an upper limit of the standby time.

12. The method according to claim 9, further comprising:

calculating the number of devices based on a distance reached by the signal sent from a transmission device.

13. A non-transitory storage medium storing a program causes a computer to execute a process, the process comprising:

calculating a number of devices which are estimated to access at a same time to an apparatus that provides a service corresponding to an event when a signal as a trigger for occurrence of the event is received;

calculating a standby time from an occurrence time of the event based on the number of devices and a condition related to the service or the apparatus; and accessing to the apparatus after staying in standby from the occurrence time of the event until the standby time elapses.

14. The storage medium according to claim 13, wherein the condition includes a response speed in the apparatus.

15. The storage medium according to claim 11, wherein the condition includes an upper limit of the standby time.

16. The storage medium according to claim 11, wherein the process further comprises:

calculating the number of devices based on a distance reached by the signal sent from a transmission device.

17. The storage medium according to claim 16, wherein the process further comprises:

calculating the number of devices based on an area of a circular area with a radius that is the distance reached by the signal.

18. The storage medium according to claim 16, wherein the process further comprises:

calculating the number of devices based on an area of an annular area with an outer circle radius that is the distance reached by the signal.

19. The storage medium according to claim 16, wherein the process further comprises:

detecting occurrence of the event when one of the signal sent from each of a plurality of transmission devices is received; and totaling the number of devices calculated based on the distance reached by the signal sent from each of the plurality of transmission devices.

20. The storage medium according to claim 16, wherein the process further comprises:

detecting occurrence of the event when the signal sent from each of the plurality of transmission devices is received at a same time; and identifying a minimum number of devices out of the number of devices calculated based on the distance reached by the signal sent from each of the plurality of transmission devices.

* * * * *